United States Patent
Hotta et al.

(10) Patent No.: US 6,362,130 B1
(45) Date of Patent: Mar. 26, 2002

(54) REVERSIBLE THERMOSENSITIVE RECORDING MEDIUM, CARD, LABEL, DISK, DISK CARTRIDGE, TAPE CASSETTE, METHOD OF PRODUCING THE RECORDING MEDIUM, AND METHOD OF RECORDING AND ERASING IMAGES USING THE SAME

(75) Inventors: Yoshihiko Hotta; Kunichika Morohoshi; Masafumi Torii; Kunitoshi Sugiyama; Hideyuki Kobori, all of Shizuoka; Katsushi Sugiyama, Chiba; Katsuaki Kokubo, Tokyo; Koji Kawai, Chiba; Kazuo Hosoda; Masafumi Moriya, both of Saitama, all of (JP)

(73) Assignees: Ricoh Company, Ltd.; Miyoshi Yushi Kabushika Kaisha, both of Tokyo (JP)

( * ) Notice: Subject to any disclaimer, the term of this patent is extended or adjusted under 35 U.S.C. 154(b) by 0 days.

(21) Appl. No.: 09/146,931

(22) Filed: Sep. 2, 1998

(30) Foreign Application Priority Data

Sep. 4, 1997 (JP) .............................................. 9-254132

(51) Int. Cl.$^7$ ........................... B41M 5/26; B41M 5/30; B41M 5/36
(52) U.S. Cl. ....................................... 503/201; 427/150
(58) Field of Search ................................. 427/150–152; 503/201

(56) References Cited

U.S. PATENT DOCUMENTS 5,849,651 A * 12/1998 Takayama et al. .......... 503/201

FOREIGN PATENT DOCUMENTS

GB 2256496 12/1992

* cited by examiner

Primary Examiner—Bruce H. Hess
(74) Attorney, Agent, or Firm—Cooper & Dunham LLP

(57) ABSTRACT

A reversible thermosensitive recording medium is capable of assuming a first color in a first temperature range which is above room temperature, having a first color assuming initiation temperature and a first color assuming upper-limit temperature, and assuming a second color when heated to a second temperature range which is above the first temperature range and then cooled, having a second color assuming lower-limit temperature, (a) the first color assuming upper-limit temperature being 125° C. or more, (b) the difference between the first color assuming upper-limit temperature and the second color assuming lower-limit temperature being 20° C. or less, and (c) the first color assuming initiation temperature being 95° C. or more, and a method of recording and erasing images, using the recording medium, a method of producing the recording medium, and the application thereof a card, a label, writable or rewritable disk cartridge, disk and tape cassette are proposed.

69 Claims, 10 Drawing Sheets

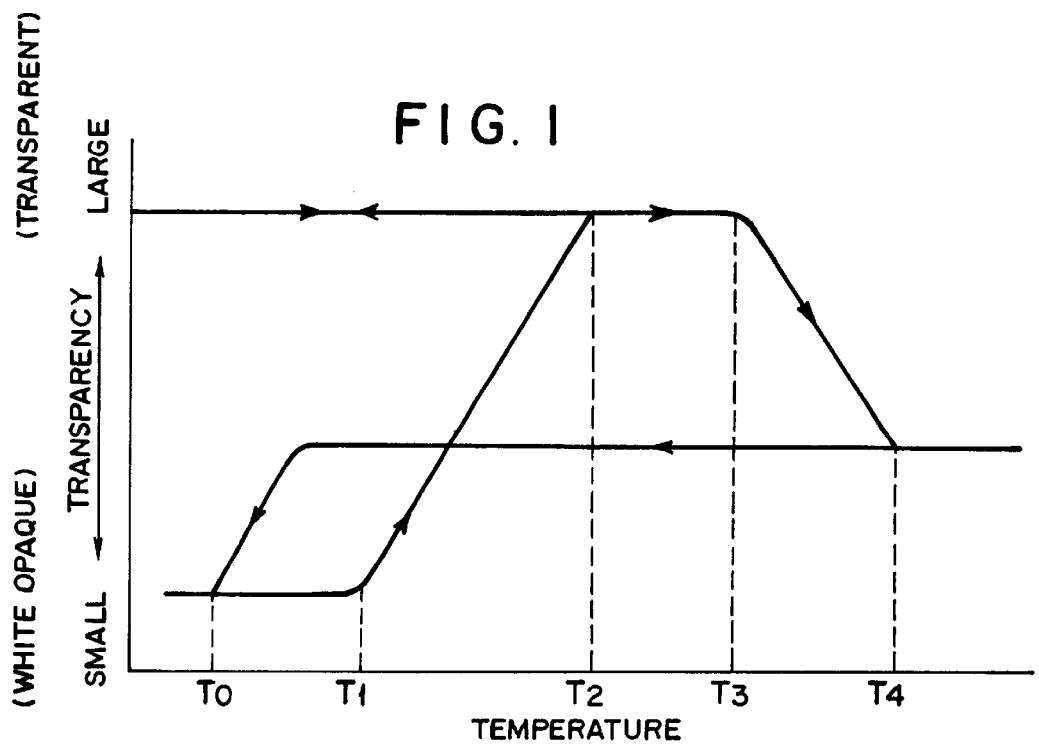
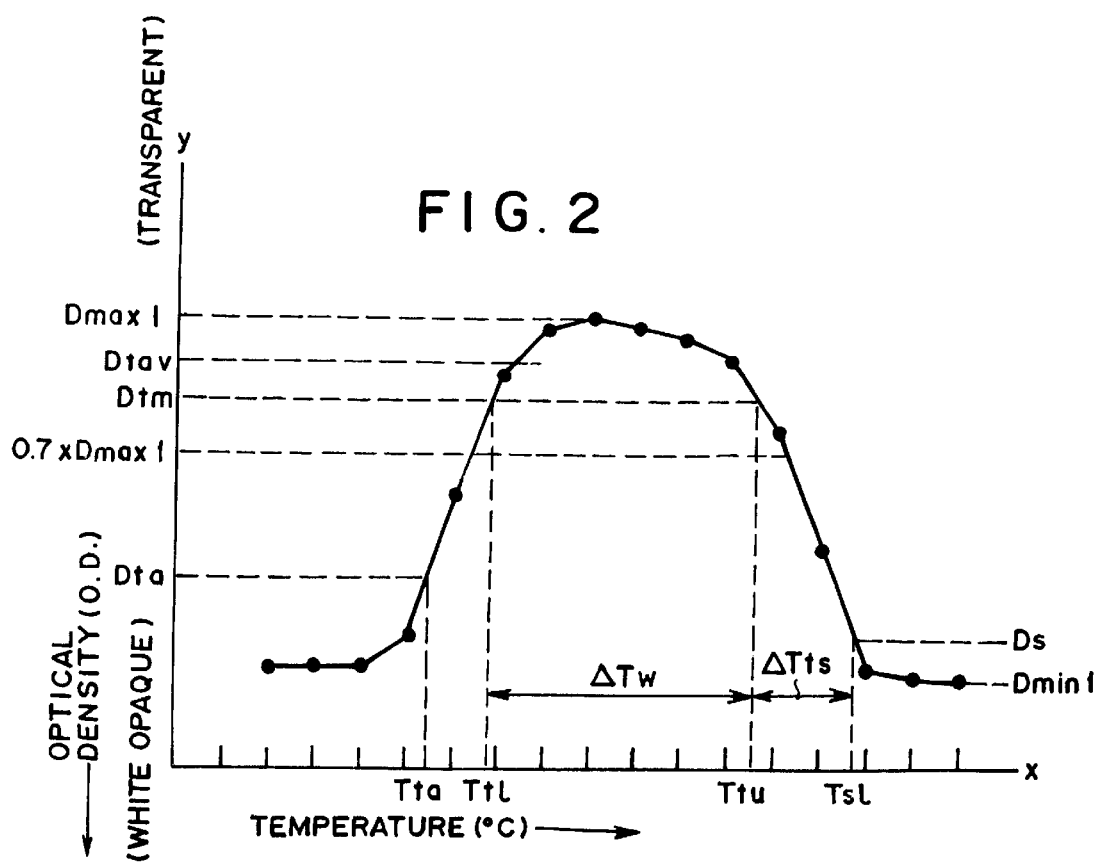

FIG. 9
(FRONT SIDE)
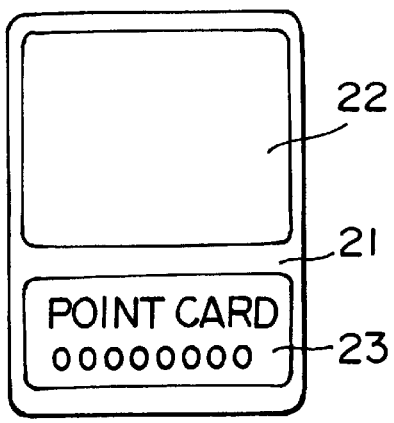
(BACK SIDE)
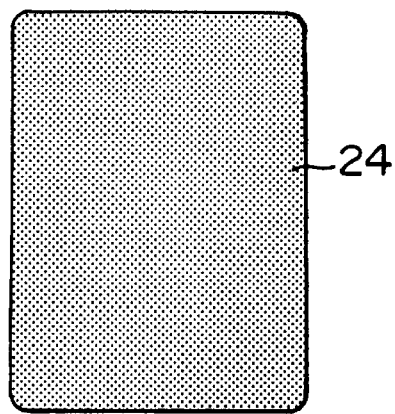
FIG. 10b
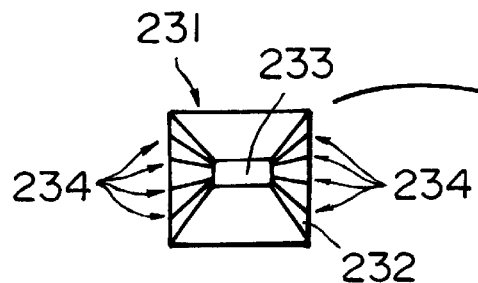
FIG. 10a
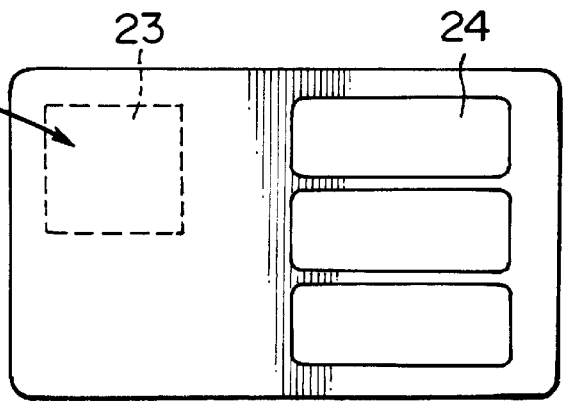

REVERSIBLE THERMOSENSITIVE RECORDING MEDIUM, CARD, LABEL, DISK, DISK CARTRIDGE, TAPE CASSETTE, METHOD OF PRODUCING THE RECORDING MEDIUM, AND METHOD OF RECORDING AND ERASING IMAGES USING THE SAME

BACKGROUND OF THE INVENTION

1. Field of the Invention

The present invention relates to a reversible thermosensitive recording medium, more particularly to a reversible thermosensitive recording medium comprising a reversible thermosensitive recording layer of which transparency or color tone is reversibly changeable depending upon the temperature thereof, thereby recording information therein and erasing recorded information therefrom repeatedly as desired. The reversible thermosensitive recording may be used in information recording devices in any form, for instance, in the form of a card, a disk, a label, a disk cartridge or a tape cassette. The present invention also relates to a method of producing the above reversible thermosensitive recording medium. The present invention also relates to a method of recording images and erasing the same, using the reversible thermosensitive recording medium.

2. Discussion of Background

Recently attention has been paid to a reversible thermosensitive recording material capable of temporarily recording images therein and erasing the same therefrom when such images become unnecessary. For example, Japanese Laid-Open Patent Application 55-154198 discloses a representative example of a reversible thermosensitive recording material in which an organic low-molecular-wieght material such as a higher fatty acid is dispersed in a matrix resin such as a vinyl chloride—vinyl acetate copolymer.

However, such a conventional reversible thermosensitive recording material has a shortcoming that a temperature range in which the recording material exhibits light transmission or transparency characteristics or is in a transparent stare (hereinafter referred to as the transparentizing temperature width) is as narrow as 2 to 4° C., so that it is difficult to control the temperature for performing such image formation while utilizing the properties of reversibly becoming transparent or light shielding or opaque or milky white.

With this shortcoming of the above reversible thermosensitive recording material taken into consideration, the inventors of the present invention previously proposed to facilitate image erasure (making recorded images transparent) by using a mixture of a higher fatty acid and an aliphatic dicarboxylic acid to broaden the transparentizing temperature width to about 20° C. as described in Japanese Laid-Open Patent Applications 2-1363 and 3-2089.

In order to improve such erasability, it is also proposed to broaden the transparentizing temperature width by using a mixture of (a) a higher ketone or a fatty acid ester having a lower melting point than that of the higher fatty acid, and (b) an aliphatic dicarboxylic acid or a saturated aliphatic bisamide as described in Japanese Laid-Open Patent Applications 4-366682, 5-294062 and 6-255247. These methods are capable of broadening the transparentizing temperature width and accordingly capable of improving the erasability. However, due to the use of the higher ketone or fatty acid ester having a lower melting point than that of the higher fatty acid, the transparentizing temperature width is situated in a low temperature range, so that these methods have a shortcoming that the formed opaque or milky white images are erased when the ambient temperature thereof is high, for instance, when placed on a dashboard in midsummer.

It has been proposed to shift the transparentizing temperature width to a high temperature side by using a mixture of (a) an organic low-molecular-weight compound having a low melting point and (b) an alicyclic dicarboxylic acid having a melting point of about 200° C. which is significantly higher than the melting points of aliphatic dicarboxylic acids (as described in Japanese Laid-Open Patent Applications 5-139053, 6-48024 and 6-48025, or by using a mixture of (a) an organic low-molecular-weight compound having a low melting point and (b') a low-molecular compound having a steroid skeleton having a melting point near 200° C. (as described in Japanese Laid-Open Patent Applications 8-20167 and 8-282131). However, despite the use of the above-mentioned compounds having such extremely high melting points, the upper-limit of the transparentizing temperature width is not shifted so much to a high temperature side and accordingly the erasability is not substantially improved. In order to improve the erasability, there is no choice but to use an organic low-molecular-weight compound having a low melting point, but when an organic low-molecular-weight compound having a low melting point is used, the heat resistance of images formed tends to be lowered.

Furthermore, the recording media disclosed in the above-mentioned Japanese laid-open patent applications have the shortcomings that the temperature difference between a transparentizing upper-limit temperature and an opaqueness initiation lower-limit temperature is so large that a significantly large amount of energy is required for the formation of milky white images, and that the durability of the media is lowered while in repeated use, with the surface of the recording media scratched, and the opaqueness of the image lowered in the course of repeated image printing and erasure.

When a large amount of energy is required for the image formation, a thermal head's pulse application time is required to be lengthened since there is a limit to a voltage that can be applied to the thermal head from a power source, or the recording speed has to be lowered. Furthermore, when the recording speed is lowered, or when the amount of energy applied to the thermal head is increased, the life of the thermal head is shortened. Thus, when the amount of energy required for the image formation is increased, the applied energy has adverse effects on an apparatus using the reversible thermosensitive recording medium. In this case, it is considered that the high opaqueness initiation temperature is caused by the use of the low-molecular weight compound having an excessively higher melting point.

Furthermore, there are proposed reversible thermosensitive recording media using a leuco dye and a color developer having a long chain alkyl group, capable of inducing a color in the leuco dye in Japanese Laid-Open Patent Applications 5-124360, 5-294063 and 6-171225. The recording media have an advantage over other conventional recording media that images can be developed in a variety of colors such as black and red, when the dye therefor is appropriately selected for use in the recording media, but have a shortcoming that the heat resistance of the images is inferior to that of image s obtained by the above-mentioned reversible thermosensitive recording media capable of forming milky white images with a transparent background or transparent images with a milky white background. It is considered that this shortcoming is caused by the vibrations of the long chain alkyl group of the color developer, initiated when heated to 50 to 60° C. even though the melting point of the color developer is as high as 150° C. or more, which vibrations cause the color developer to separate from the dye, and accordingly decolorize the images.

SUMMARY OF THE INVENTION

It is therefore a first object of the present invention to provide a reversible thermosensitive recording medium with an extended transparentizing temperature width, while maintaining the capability of producing images with high heat resistance, and with high repeated use durability, which is capable of producing images with high contrast and erasing the same with high erasability even when the ambient temperature is high.

A second object of the present invention is to provide a method of producing the above reversible thermosensitive recording medium.

A third object of the present invention is to provide an information recording device utilizing the reversible thermosensitive recording medium of the present invention.

A fourth object of the present invention is to provide a method of recording images in any of the reversible thermosensitive recording medium of the present invention and the information recording devices and/or erasing recorded images therefrom.

The first object of the present invention can be achieved by a reversible thermosensitive recording medium capable of assuming a first color in a first temperature range which is above room temperature, having a first color assuming initiation temperature and a first color assuming upper-limit temperature, and assuming a second color when heated to a second temperature range which is above the first temperature range and then cooled, having a second color assuming lower-limit temperature, (a) the first color assuming upper-limit temperature being 125° C. or more,
(b) the difference between the first color assuming upper-limit temperature and the second color assuming lower-limit temperature being 20° C. or less, and
(c) the first color assuming initiation temperature being 95° C. or more.

The above reversible thermosensitive recording medium may further have a first color assuming lower-limit temperature, and it is preferable that a first color variation temperature width which corresponds to the difference between the first color assuming upper-limit temperature and the first color assuming lower-limit temperature be 20° C. or more.

It is also preferable that the first color assuming upper-limit temperature is 130° C. or more in the above reversible thermosensitive recording medium.

It is also preferable that the difference between the first color assuming upper-limit temperature and the second color assuming lower-limit temperature be 15° C. or less in the above reversible thermosensitive recording medium.

The first object of the present invention can also be achieved by a reversible thermosensitive recording medium comprising a reversible thermosensitive recording layer which comprises a matrix resin and an organic low-molecular-weight material dispersed in the matrix resin, of which transparency is reversibly changeable depending upon the temperature thereof, the organic low-molecular-weight material comprising a mixture of at least one straight chain compound (A) comprising at least one bond selected from the group consisting of amide bond, urea bond and sulfonyl bond, and at least one carboxyl group, and having a melting point of 130° C. or more, and at least one straight chain compound (B) having a melting point which is lower by at least 20° C. than the melting point of the straight chain compound (A), the reversible thermosensitive recording medium capable of assuming a first color at a first temperature range which is above room temperature, having a first color assuming initiation temperature and a first color assuming upper-limit temperature, and assuming a second color when heated to a second temperature range which is above the first temperature and then cooled, having a second color assuming lower-limit temperature, (a) the first color assuming upper-limit temperature being 125° C. or more,
(b) the difference between the first color assuming upper-limit temperature and the second color assuming lower-limit temperature being 20° C. or less, and
(c) the first color assuming initiation temperature being 95° C. or more.

The above reversible thermosensitive recording medium may further have a first color assuming lower-limit temperature, and it is preferable that a first color variation temperature width which corresponds to the difference between the first color assuming upper-limit temperature and the first color assuming lower-limit temperature be 20° C. or more.

It is also preferable that the first color assuming upper-limit temperature be 130° C. or more in the above reversible thermosensitive recording medium.

In the above reversible thermosensitive recording medium, it is also preferable that the difference between the first color assuming upper-limit temperature and the second color assuming lower-limit temperature be 15° C. or less.

In the above reversible thermosensitive recording medium, it is preferable that the straight chain compound (B) have a melting point of 85° C. or more.

In the above reversible thermosensitive recording medium, it is also preferable that the straight chain compound (B) have a melting point of 120° C. or less.

In the above reversible thermosensitive recording medium, it is also preferable that the straight chain compound (B) have a melting point in a range of 85° C. to 120° C.

In the above reversible thermosensitive recording medium, it is preferable that the straight chain compound (B) and the straight chain compound (A) be mixed in a mixing ratio by parts by weight of 98:2 to 10:90.

In the above reversible thermosensitive recording medium, it is preferable that as the straight chain compound (A), a straight chain compound comprising an amide bond and a carboxyl group be used.

Furthermore, it is preferable that as the straight chain compound (A), a straight chain compound of general formula (1) be used:

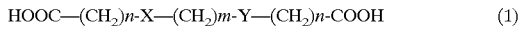

$$HOOC-(CH_2)_n-X-(CH_2)_m-Y-(CH_2)_n-COOH \quad (1)$$

wherein $1 \leq n \leq 26$, $1 \leq m \leq 26$, and X and Y each independently represent CONH or NHCO, but do not have an identical structure at the same time.

In the above reversible thermosensitive recording medium, it is preferable that as the straight chain compound (A), a straight chain compound comprising a urea bond and a carboxyl group be used. For example, it is preferable that a straight chain compound of general formula (2) be used:

$$CH_3-(CH_2)_n-Z-(CH_2)_m-COOH \quad (2)$$

wherein $0 \leq n \leq 25$, $1 \leq m \leq 26$, and Z represents NHCONH.

The straight chain compound (A) may be a straight chain compound comprising a sulfonyl bond and a carboxyl group, for example, a straight chain compound of general formula (3):

$$CH_3-(CH_2)n\text{-}Z\text{-}(CH_2)m\text{-}COOH \quad (3)$$

wherein $0 \leq n \leq 25$, $1 \leq m \leq 26$, and Z represents $SO_2$.

It is also preferable that in the above reversible thermosensitive recording medium, the organic low-molecular-weight material further comprise at least one straight chain compound (C) in the mixture, having a melting point which is higher by at least 10° C. than that of the straight chain compound (B) and is lower by at least 10° C. than that of the straight chain compound (A).

The second object of the present invention can be achieved by a method of producing a reversible thermosensitive recording medium comprising a support, and a reversible thermosensitive recording layer formed thereon comprising a matrix resin and an organic low-molecular-weight material dispersed in the matrix resin, of which transparency is reversibly changeable depending upon the temperature thereof, capable of assuming a first color in a first temperature range which is above room temperature, having a first color assuming initiation temperature and a first color assuming upper-limit temperature, and assuming a second color when heated to a second temperature range which is above the first temperature and then cooled, having a second color assuming lower-limit temperature, (a) the first color assuming upper-limit temperature being 125° C. or more,
(b) the difference between the first color assuming upper-limit temperature and the second color assuming lower-limit temperature being 20° C. or less, and
(c) the first color assuming initiation temperature being 95° C. or more, comprising the steps of:
coating on the support a dispersion comprising a solvent, the matrix resin and the organic low-molecular-weight material comprising an organic low-molecular-weight compound having a melting point of 130° C. or more, which organic low-molecular-weight material is dispersed in the form of a solid in the matrix resin, and
drying the dispersion with application of heat thereto so as to dissolve the organic low-molecular-weight material in the solvent when heat is applied thereto, thereby forming the reversible thermosensitive recording layer on the support.

In the above method, it is preferable that the organic low-molecular-weight material dispersed in the dispersion have a solubility of 0.5% or more in the solvent at a temperature at which the dispersion coated on the support is dried with application of heat thereto.

It is also preferable that in the above-mentioned method, the organic low-molecular-weight material dispersed in the dispersion have a solubility of less than 0.5% in the solvent at room temperature.

The second object of the present invention can also be achieved by a method of producing a reversible thermosensitive recording medium comprising a support, and a reversible thermosensitive recording layer formed thereon comprising a matrix resin and an organic low-molecular-weight material dispersed in the matrix resin, of which transparency is reversibly changeable depending upon the temperature thereof, capable of assuming a first color at a first temperature which is above room temperature, having a first color assuming initiation temperature and a first color assuming upper-limit temperature, and assuming a second color when heated to a second temperature which is above the first temperature and then cooled, having a second color assuming lower-limit temperature, (a) the first color assuming upper-limit temperature being 125° C. or more,
(b) the difference between the first color assuming upper-limit temperature and the second color assuming lower-limit temperature being 20° C. or less, and
(c) the first color assuming initiation temperature being 95° C. or more, comprising the steps of:
coating on the support a dispersion comprising a solvent, the matrix resin and the organic low-molecular-weight material comprising (a) at least one organic low-molecular-weight compound and (b) an organic low-molecular-weight compound having a melting point of 130° C. or more, which organic low-molecular-weight material is dispersed in the form of a solid in the matrix resin, and
drying the dispersion with application of heat thereto at a temperature which is lower than the highest melting point of the melting points of the organic low-molecular-weight compounds, and then at a temperature which is not lower than the highest melting point of the melting points of the organic low-molecular-weight compounds, thereby forming the reversible thermosensitive recording layer on the support.

The third object of the present invention can be achieved by a card comprising a reversible thermosensitive recording portion which comprises any of the above-mentioned reversible thermosensitive recording media, and an information memory portion.

In the above-mentioned card, the information memory portion may comprise at least one element selected from the group consisting of a magnetic recording layer, IC and an optical memory.

It is preferable that the above-mentioned card further comprise a support on one side of which the reversible thermosensitive recording portion is provided, and that the information memory portion comprise the magnetic recording layer and be provided on a back side of the support opposite to the reversible thermosensitive recording portion with respect to the support.

The third object of the present invention can also be achieved by a reversible thermosensitive recording label comprising a support, a reversible thermosensitive recording portion which comprises any of the above-mentioned reversible thermosensitive recording media, which is provided on one side of the support, and an adhesive or tacky layer on a back side of the support opposite to the reversible thermosensitive recording portion.

The third object of the present invention can also be achieved by a disk cartridge comprising a cartridge, a rewritable disk in which information to be recorded therein is rewritable, which rewritable disk is built in the cartridge, and a reversible thermosensitive display portion which comprises any of the above-mentioned reversible thermosensitive recording media, which reversible thermosensitive recording display is provided on the surface of the cartridge.

The third object of the present invention can also be achieved by a disk cartridge comprising a cartridge, a rewritable disk in which information to be recorded therein is rewritable, which rewritable disk is built in the cartridge, and the above-mentioned reversible thermosensitive recording label, which reversible thermosensitive recording label is provided on the surface of the cartridge.

The third object of the present invention can also be achieved by a disk comprising a rewritable or write-once disk in which information to be recorded therein is rewritable or writable, and a reversible thermosensitive display portion which comprises any of the above-mentioned reversible thermosensitive recording media, which reversible thermosensitive display portion is provided on the surface of the rewritable or write-once disk.

The third object of the present invention can also be achieved by a disk comprising a rewritable or write-once disk in which information to be recorded therein is rewritable or writable, and the above-mentioned reversible thermosensitive recording label, which reversible thermosensitive recording label is provided on the surface of the rewritable or write-once disk.

The third object of the present invention can also be achieved by a tape cassette comprising a cassette member, a rewritable tape member in which information to be recorded therein is rewritable, disposed in the cassette member, and a reversible thermosensitive display portion which comprises any of the above-mentioned reversible thermosensitive recording medium, which reversible thermosensitive display portion is provided on the surface of the cassette member.

The third object of the present invention can also be achieved by a tape cassette comprising a cassette member, a rewritable tape member in which information to be recorded therein is rewritable, disposed in the cassette member, and the above-mentioned reversible thermosensitive recording label, which reversible thermosensitive recording label is provided on the surface of the cassette member.

Any of the above-mentioned reversible thermosensitive recording medium, the card, the reversible thermosensitive recording label, the disk cartridge, the disk, and the tape cassette may further comprise a portion in which an image can be irreversibly printed, or which includes such irreversibly printed image.

The fourth object of the present invention can be achieved by a method of recording images or erasing recorded images comprising applying heat for recording or erasing images to one of recording media selected from the group consisting of the above-mentioned reversible thermosensitive recording medium, the above-mentioned card, the above-mentioned reversible thermosensitive recording label, the above-mentioned disk cartridge, the above-mentioned disk, and the above-mentioned tape cassette.

In the above-mentioned method, the application of heat for recording images and/or for erasing recorded images may be carried out, using a thermal head.

Furthermore, in the above-mentioned method, the erasing of recorded images may be carried out by overwriting, with the application of heat thereto, and then images may be recorded, using a thermal head.

For the application of heat for erasing recorded images, a ceramic heater may be used. It is preferable that the ceramic heater be set at a temperature of 110° C. or more for the application of heat for erasing recorded images.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagram showing changes in the transparency of a reversible thermosensitive recording layer of a reversible thermosensitive recording medium of the present invention.

FIG. 2 is a diagram in explanation of the characteristics of a reversible thermosensitive recording medium of the present invention, such as a first color assuming initiation temperature (Tta), a first color assuming lower-limit temperature (Ttl), a first color assuming upper-limit temperature (Ttu), a second color assuming lower-limit temperature (Tsl), and a first color variation temperature difference width (ΔTw) corresponding to the difference between the first color assuming upper-limit temperature (Ttu) and the first color assuming lower-limit temperature (Ttl).

FIG. 9 is a pair of schematic front and back plan views of a card with the provision of a rewritable portion comprising the reversible thermosensitive recording medium film as shown FIG. 8c and a printed display portion on a front side thereof, and also with the provision of a magnetic recording portion comprising a magnetic recording layer on a back side thereof.

FIG. 10a is a schematic plan view of another card with the provision of a rewritable portion comprising the reversible thermosensitive recording medium film as shown FIG. 7c and also with the provision of a concave portion for holding an IC chip therein.

FIG. 10b is a schematic plan view of the IC chip for use in the card as shown in FIG. 10a.

DESCRIPTION OF THE PREFERRED EMBODIMENTS

Figure 3:
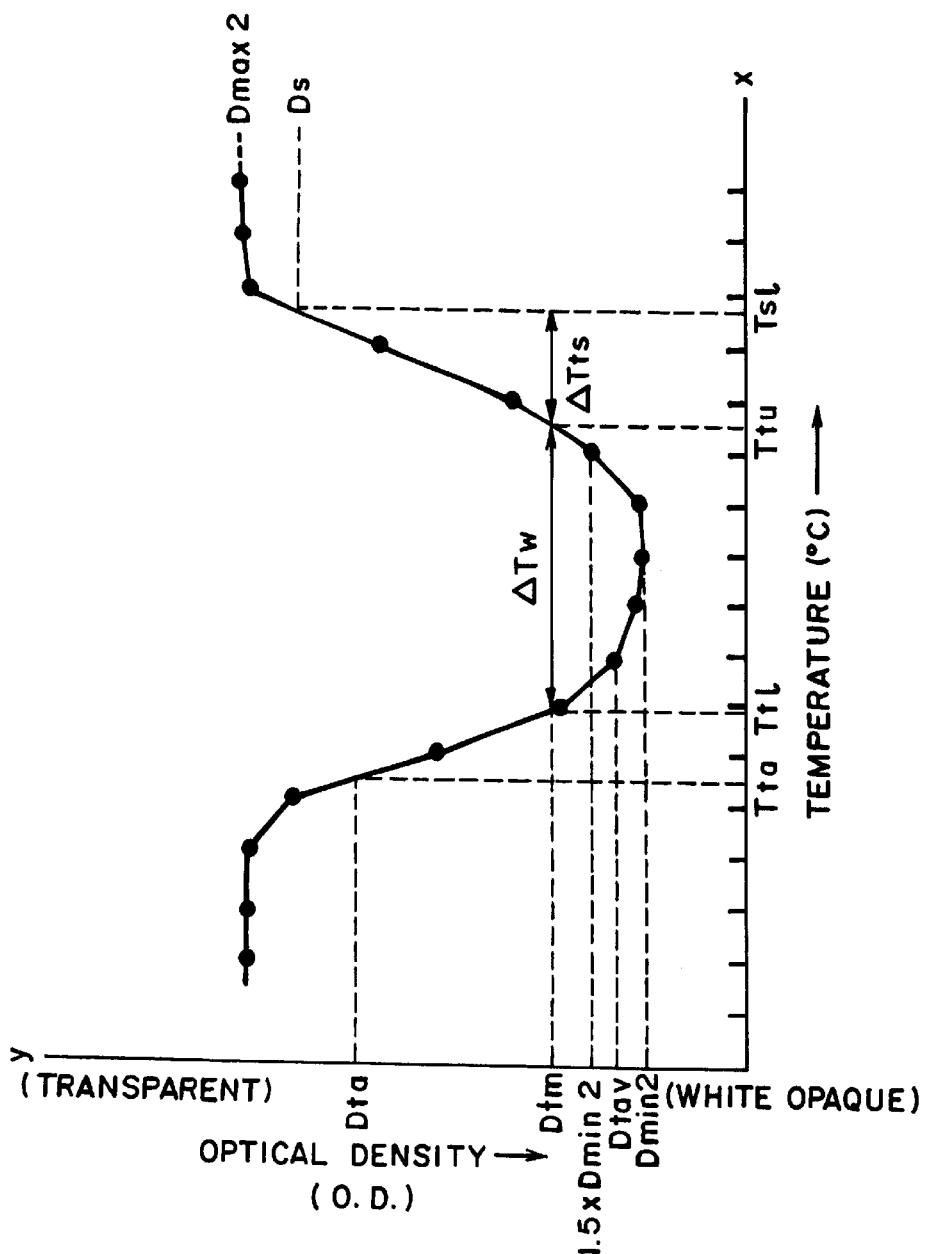
FIG. 3 is a diagram in explanation of the same characteristics as defined in FIG. 2 of another reversible thermosensitive recording medium of the present invention.

The reversible thermosensitive recording medium of the present invention is capable of assuming a first color in a first temperature range which is above room temperature, and also capable of assuming a second color when heated to a second temperature range which is above the first temperature range and then cooled.

The difference between the first color and the second color is exhibited in the form of the changes in the transparency, opaqueness, or color tone of the recording medium.

An example of the recording medium comprises a reversible thermosensitive recording layer comprising a matrix resin and a low-molecular-weight, long chain fatty acid dispersed in the matrix resin, and assumes a transparent state in the first temperature range, and assumes a milky white state in the second temperature range.

Another example of the recording medium comprises a reversible thermosensitive recording layer comprising a leuco dye and a color developer capable of inducing a color in the leuco dye, having a long alkyl chain, and is capable of assuming a black, a red or a blue state when heated lo the second temperature range, but such a color is decolorized in the first temperature range.

A further example of the recording medium comprises a reversible thermosensitive recording layer comprising a matrix resin and a particular fatty acid dispersed in the matrix resin, and assumes a milky white state in the first temperature range, and assumes a transparent state in the second temperature range.

Still another example of the recording medium comprises a reversible thermosensitive recording layer comprising a leuco dye and an ampholytic color developer capable of inducing a particular color in the leuco dye, and is capable of assuming a black, a red or a blue state in the first temperature range, and a decolorized state in the second temperature range.

Of the above-mentioned examples of the recording media, the recording media which are capable of assuming a black, a red or a blue state, using the leuco dye, are preferably employed because of the production of excellent image contrast.

Of the above-mentioned recording media which use the leuco dye, the recording medium which uses the color developer having a long alkyl chain is particularly preferable because the temperature control for coloring and decolorizing is easy.

The above-mentioned recording media which use the leuco dye utilize chemical changes in the leuco dye and the color developer. In contrast to this, the recording media capable of assuming a transparent state in the first temperature range and a milky white state in the second temperature range, utilizes physical changes in the matrix resin and the low-molecular-weight material, such as fatty acid, dispersed in the matrix resin, so that such recording media exhibit better preservation stability, sensitivity and durability than the recording media utilizing the above-mentioned chemical changes.

With respect to the reversible thermosensitive recording medium of the present invention, which is capable of assuming a transparent state and a milky white opaque state for recording images or information, the difference between the transparent state and the milky white opaque state of the reversible thermosensitive recording medium is considered to be caused, based on the following principle:

(1) In the transparent state, finely-divided particles of an organic low-molecular-weight material are dispersed in a matrix resin in such a state that the particles are in close contact with the matrix resin without any gap therebetween and any void in the particles of the organic low-molecular-weight material. Therefore, rays of light which enter the recording layer from one side thereof pass therethrough to the opposite side, without being scattered. Thus, the reversible thermosensitive recording layer appears transparent.

(ii) In the milky white opaque state, the organic low-molecular-weight material is composed of polycrystals consisting of numerous small crystals of the organic low-molecular-weight material, so that there are gaps at the boundaries of the crystals or at the interfaces between the crystals and the matrix resin. Therefore, when rays of light enter the recording layer from one side thereof, the light is refracted, reflected and scattered at the interface between the gap and the crystals, and between the gap and the resin. As a result, the reversible thermosensitive recording layer appears milky white opaque.

FIG. 1 is a diagram showing changes in the transparency of the reversible thermosensitive recording layer which comprises as the main components a matrix resin and the particles of the organic low-molecular-weight material dispersed in the matrix resin.

It is supposed that the recording layer is in a milky white opaque state at room temperature, that is, a temperature $T_0$ or below.

When the temperature of the recording layer is raised by the application of heat thereto, the recording layer gradually begins to become transparent at temperature $T_1$. The recording layer assumes a completely transparent state when heated to a temperature in the range of $T_2$ to $T_3$. Even when the temperature of the recording layer in such a transparent state is decreased back to room temperature, the transparent state is maintained. This is because when the temperature of the recording layer is raised and reaches a temperature near $T_1$, the matrix resin begins to soften, so that the gaps at the interface between the matrix resin and the particles of the organic low-molecular-weight material, and the gaps within the particles of the low-molecular-weight material are decreased. As a result, the transparency of the recording layer gradually increases. When the temperature of the recording layer reaches $T_2$ to $T_3$, the organic low-molecular-weight material is in a half-melted state, so that the remaining gaps are filled with the organic low-molecular-weight material. As a result, the recording layer becomes transparent. The recording layer in such a transparent state, however, still contains seed crystals of the organic low-molecular-weight material. Therefore, when the recording layer in such a transparent state is cooled, the organic low-molecular-weight material crystallizes at a relatively high temperature. At the crystallization of the organic low-molecular-weight material, the matrix resin is still in a softened state, so that the matrix resin can compensate the changes in the volume of the organic low-molecular-weight material caused by the crystallization, thereby forming substantially no gaps therebetween. Thus, the transparent state is maintained.

When the recording layer maintained at a temperature in the range of $T_2$ to $T_3$ is further heated to a temperature $T_4$ or more, the recording layer assumes a semi-transparent state with an intermediate transparency between the maximum transparent state and the maximum opaque state.

When the temperature of the recording layer in such a semi-transparent state is decreased, the recording layer assumes the initial milky white opaque state again, without assuming the transparent state during the cooling process.

This is because the organic low-molecular weight material is completely melted at the temperature $T_4$ or more, and thereafter, the organic low-molecular-weight material is supercooled and crystallizes out at a temperature slightly higher than the temperature $T_0$ in the course of the cooling step. It is considered that, in this case, the matrix resin cannot follow up the changes in the volume of the organic low-molecular-weight material caused by the crystallization thereof, so that gaps are formed between the matrix resin and the organic low-molecular-weight material.

The temperature—transparency changes curve shown in FIG. 1 is a representative example. Depending on the kind of the material to be employed in the recording layer, there may be some difference, for example, in the transparency at each state of the recording layer.

Taking, as an example, a reversible thermosensitive recording medium which comprises a reversible thermosensitive recording layer comprising a matrix resin and a low-molecular-weight organic material dispersed in the matrix resin, and assumes a transparent state in a first temperature range, and a milky white state in a second temperature range, the definitions of the following characteristics of the reversible thermosensitive recording medium of the present invention will now be explained: a first color assuming upper-limit temperature (Ttu), a second color assuming lower-limit temperature (Tsl), a temperature difference ($\Delta$Tts) between the second color assuming lower-limit temperature (Tsl) and the first color assuming upper-limit temperature (Ttu), a first color assuming initiation temperature (Tta), a first color assuming lower-limit temperature (Ttl), and a first color variation temperature difference width ($\Delta$Tw) corresponding to a temperature difference between the first color assuming upper-limit temperature (Ttu) and the first color assuming lower-limit temperature (Ttl).

A sample of the reversible thermosensitive recording medium of the present invention in a milky white state is prepared. When a reversible thermosensitive recording medium in a transparent state or in an insufficient milky white state is used for preparing the above-mentioned sample, the desired sample can be prepared by bringing the medium into close contact with a sufficiently heated hot plate for about 10 to 30 seconds, since such a transparent or insufficient milky white state can be easily changed to the complete milky white state bringing the medium into close contact with the heated hot plate in the above-mentioned manner.

An appropriate temperature of the hot plate for changing the transparent or insufficient milky white state to the complete milky white state can be found by heating the reversible recording medium to a first temperature to observe the milky white state, and then to a second temperature which is higher, for instance, by 10° C. than the first temperature to see the difference between the degree of the milky white state at the first temperature and that at the second temperature. If there is no difference between the first temperature and the second temperature, the first temperature is considered to be a sufficiently high temperature for changing the transparent or insufficient milky white state to the complete milky white state. If there is a difference in the degree of the milky white state between the first temperature and the second temperature, the medium is heated to a third temperature or to a higher temperature until there are discovered a pair of temperatures at which there is no difference in the degree of the milky white state between the two temperatures.

Test samples of the recording media which are in the milky white state are heated to various temperatures, whereby a temperature at which the recording media become transparent is determined. For the determination of the temperature, a commercially available heat gradient tester (Trademark "Type HG-100", made by Toyo Seiki Seisakusho, Ltd.) is used in practice.

This heat gradient tester includes five heat application blocks. Each block can be independently set at a different temperature with a different heat application time and the application of a different pressure. Thus, the test sample of the recording medium can be heated to five different temperatures at five different portions simultaneously under predetermined conditions.

More specifically, with the heat application time set at 1 second and the pressure applied in the course of the heat application set at about 2.5 kg/cm$^2$, the test sample is heated to a low temperature at which the milky white state is not changed to an appropriate temperature at which the milky white state is changed to a transparent state, with equal temperature intervals in the range of 1° C. to 5° C.

In order to prevent the test sample from adhering or sticking to the heat block, a polyimide or polyamide film with a thickness of 10 $\mu$m or less may be interposed between the test sample and the heat block.

The test sample is thus heated, and then cooled to room temperature, and the density of each heated portion in the test sample is measured by use of Macbeth densitometer RD-914, whereby a graph as shown in FIG. 2 can be obtained with the temperature set by the heat gradient tester as abscissa, and the optical density of the heated portion as ordinate. More specifically, the density data is plotted with the temperature as abscissa and the optical density of the heated portion as ordinate to produce a density data curve as shown in the graph in FIG. 2. As shown in FIG. 2, the curve is usually in the form of a trapezoid.

When the reversible thermosensitive recording medium comprises a transparent support, the density of the milky white portions is measured, with the recording medium placed on a light-absorbing sheet or a regular reflecting sheet.

The above density data may vary depending upon the thickness of the recording medium including the support and the reversible thermosensitive recording layer, and also upon the materials of the recording medium. When the thickness of the recording medium is 300 $\mu$m or less, that thickness does not have any substantial effect on the density data obtained. When the thickness exceeds 300 $\mu$m, the support of the recording medium should be made thinner down to 300 $\mu$m or less, for instance, by planing part of the support away off. Alternatively, the density data is converted into a density data corresponding to that obtained when the thickness of the recording medium is 300 $\mu$m or less.

As the materials for the support, any polymeric materials can be employed. When a metal is used, the density data will have to be converted into an appropriate density, with the density of the metal taken into consideration.

From the graph shown in FIG. 2, the above-mentioned first color assuming upper-limit temperature (Ttu), the second color assuming lower-limit temperature (Tsl), the temperature difference (ΔTts) between the first color assuming upper-limit temperature (Ttu) and the second color assuming lower-limit temperature (Tsl), the first color assuming initiation temperature (Tta), the first color assuming lower-limit temperature (Ttl), and the temperature difference width (ΔTw) between the first color assuming upper-limit temperature (Ttu) and the first color assuming lower-limit temperature (Ttl), which may be referred to as the first color variation temperature width, are read and calculated. When reading and calculating the above data, the transparent recording medium is placed on a light-absorbing sheet.

To begin with, a maximum reflection density (Dmax1) is read. Then a horizontal line of 0.7×Dmax1 (Y=0.7×Dmax1) is drawn. 5 to 20 points are selected on the plotted density data curve, which are above the horizontal line of 0.7× Dmax1. When the number of the selected points is less than the above, a calculation result which will be obtained later will not be reliable. In such a case, it is necessary to increase the number of the points to be selected by narrowing the temperature intervals when the measurement is performed using the heat gradient tester.

Out of the selected points, the same number of points are eliminated from a lower density range and from an upper density range, and a first color average density (Dtav) of the recording medium itself is calculated from the remaining points indicating the reflection density. It is preferable that the ratio of the points to be eliminated from all the selected points in each of the lower density range and the upper density range be 10 to 30%, more preferably 15 to 25% in order to perform accurate calculation of the density of the first color of the recording medium.

A first color lower-limit density (Dtm) is calculated from the following formula (I):

$$Dtm = Dtav - 0.2 \times (Dtav - Dmin1) \tag{I}$$

wherein Dmin1 is a minimum second color density, which can be calculated from an average value of the densities of three adjacent points when a sufficient milky white state is attained at the three points in the course of the elevation of the temperature. Dtm indicates a density at and above which the recording medium appears almost transparent by visual inspection.

A horizontal line, y=Dtm, is then drawn across the graph, whereby a lower temperature and a higher temperature corresponding to the cross points of the density data curve and the horizontal line, y=Dtm, are determined. The lower temperature is defined as the first color assuming lower-limit temperature (Ttl), while the upper temperature is defined as the first color assuming upper-limit temperature (Ttu). The first color variation temperature width (ΔTw) is determined from the following formula (II):

$$\Delta Tw = Ttu - Ttl \tag{II}$$

A second color upper-limit density (Ds) is calculated from the following formula (III):

$$Ds = Dmin1 + 0.1 \times (Dtav - Dmin1) \tag{III}$$

A horizontal line, y=Ds, is drawn across the graph, so that a temperature corresponding to a cross point of (a) a portion of the density data curve where the state of the recording medium changes from the first color to the second color and (b) the horizontal line, y=Ds, is determined as the second color assuming lower-limit temperature (Tsl).

The temperature difference (ΔTts) between the second color assuming lower-limit temperature (Tsl) and the first color assuming upper-limit temperature (Ttu) is obtained from the following formula (IV):

$$\Delta Tts = Tsl - Ttu \tag{IV}$$

The first color assuming initiation temperature (Dta) is obtained from the following formula (V):

$$Dta = Dmin1 + 0.25 \times (Dtav - Dmin1) \tag{V}$$

The first color assuming initiation temperature (Tta) can also be obtained by determining a temperature corresponding to a cross point of the density data curve and a horizontal line, y=Dta, as shown in the graph in FIG. 2.

The definitions explained above, using the graph of FIG. 2, can also be applied in the same manner as mentioned above to a reversible thermosensitive recording medium of such a type that the density of the recording medium increases when heated to the first temperature range, and the density of the recording medium decreases when heated to the second temperature range.

However, the above-mentioned definitions cannot be applied as they are to a reversible thermosensitive recording medium of such a type that the density of the recording medium decreases when heated to the first temperature range, and the density of the recording medium increases when heated to the second temperature range.

Taking, as an example, a reversible thermosensitive recording medium which comprises a reversible thermosensitive recording layer comprising a leuco dye and a color developer capable of inducing a color in the leuco dye, having a long alkyl chain, and capable of assuming a low density state in the first temperature range, and a high density state in the second temperature range, the definitions of the following characteristics of the reversible thermosensitive recording medium of the present invention will now be explained: a first color assuming upper-limit temperature (Ttu), a second color assuming lower-limit temperature (Tsl), a temperature difference (ΔTts) between the second color assuming lower-limit temperature (Tsl) and the first color assuming upper-limit temperature (Ttu), a first color assuming initiation temperature (Tta), a first color assuming lower-limit temperature (Ttl), and a first color variation temperature difference width (ΔTw) corresponding to a temperature difference between the first color assuming upper-limit temperature (Ttu) and the first color assuming lower-limit temperature (Ttl).

A sample of the reversible thermosensitive recording medium of the present invention for determining the definitions of the above characteristics of the recording medium can be heated in the same manner, using the same heater as mentioned above. However, in the case of the reversible thermosensitive recording medium, using the leuco dye, some of examples of the recording medium have to be rapidly cooled to produce a color after heating. In such a case, the recording medium is rapidly cooled by immersing the recording medium into cold water or liquid nitrogen, or by bringing the recording medium into close contact with a cooled metal plate.

In contrast to the density data curve shown in FIG. 2, the density data curve of the above reversible thermosensitive recording medium is inverted as shown in FIG. 3.

To begin with, a minimum reflection density (Dmin2) is read. Then a horizontal line of 1.5×Dmin2 (Y=1.5×Dmin2) is drawn. 5 to 20 points are selected on the plotted density data curve, which are below the horizontal line of 1.5× Dmin2.

In the same manner as in the above, a first color average density (Dtav) is calculated. Of the above-mentioned formulae (I) to (V), the formulae (II) and (IV) can be applied to the recording medium of this type. However, the formulae (I), (III) and (V) are changed as follows:

The definition of Dtm in the formula (I) is changed to the following formula (VI):

$$Dtm=Dtav+0.05\times(Dmax2-Dtav) \qquad (VI)$$

wherein Dman2 is a maximum second color density, which can be calculated from an average value of the densities of three adjacent points when a sufficiently colored second color state is attained at three relatively low temperature points in the course of the elevation of the temperature. Dtm indicates a density at or below which the recording medium appears sufficiently decolorized by visual inspection, in comparison with the colored state.

The definition of Ds in the formula (III) is changed to the following formula (VII):

$$Ds=Dmax2-0.2\times(Dmax2-Dtav) \qquad (VII)$$

The definition of Dta in the formula (V) is changed to the following formula (VIII):

$$Dta=Dmax2-0.3\times(Dmax2-Dtav) \qquad (VIII)$$

As mentioned above, the same definitions cannot be applied to both (1) the reversible thermosensitive recording medium of the type that the density of the recording medium increases when heated to the first temperature range, and the density of the recording medium decreases when heated to the second temperature range and (2) the reversible thermosensitive recording medium of the type that the density of the recording medium decreases when heated to the first temperature range, and the density of the recording medium increases when heated to the second temperature range. The reasons for this are as follows:

Even if the absolute value of the difference between a reference density and a comparative density is the same, for instance, 0.1, when the comparative density is low, the ratio of the difference value such as 0.1 to the comparative density is relatively large, while when the comparative density is high, the ratio of the difference value such as 0.1 to the comparative density is relatively small, so that when the comparative density is low, the multipliers in the formulae (III), (V) and (VI) are made small, while when the comparative density is high, the multipliers in the formulae (I), (VII) and (VIII) are made large.

In the present invention, it is required that that the first color assuming upper-limit temperature (Ttu) be 125° C. or more. When the first color assuming upper-limit temperature (Ttu) is as high as 125° C. or more, it is possible to increase the first color variation temperature difference width (ΔTw) without lowering the durability of images formed. It is preferable that the first color assuming upper-limit temperature (Ttu) be 130° C. or more, more preferably 135° C. or more, furthermore preferably 140° C., for improvement of the erasability of the recording medium, and that the first color assuming upper-limit temperature (Ttu) be 190° C. or less, more preferably 180° C. or less, and furthermore preferably 170° C. or less, for improvement of the printing sensitivity of the recording medium.

It is required that the difference (ΔTts) between the second color assuming lower-limit temperature (Tsl) and the first color assuming upper-limit temperature (Ttu) be 20° C. or less. If the difference (ΔTts) is greater than 20° C., the temperature at which the recording medium assumes the second color is excessively high, so that extremely high energy is required for the formation of second color images and the surface of the recording medium tends to be scratched and the contrast of the images tends to be decreased when image recording and image erasure are repeated. It is preferable that the difference (ΔTts) be 15° C. or less, more preferably 10° C. or less.

It is preferable that the lower limit of the first color assuming initiation temperature (Tta) be 95° C. or more, more preferably 100° C. or more, furthermore preferably 105° C. or more. When the first color assuming initiation temperature (Tta) is less than 95° C., the heat resistance of the images tends to be lowered. It is also preferable that the upper limit of the first color assuming initiation temperature (Tta) be 125° C. or less, more preferably 120° C. or less, furthermore preferably 115° C. or less. The lower the first color assuming initiation temperature (Tta), the better the erasability and the printing sensitivity.

It is preferable that the lower limit of the first color variation temperature difference width (ΔTw) be 20° C. or more, more preferably 30° C. or more, furthermore preferably 40° C. or more, still furthermore preferably 45° C. or more, for improvement of the erasability of the recording medium. When the first color variation temperature difference width (ΔTw) is less than 20° C., the erasability of the recording medium tends to be lowered. It is also preferable that the upper limit of the first color variation temperature difference width (ΔTw) be 100° C. or less, more preferably 90° C. or less, furthermore preferably 80° C. or less for improvement of the printing sensitivity.

When the first color variation temperature difference width (ΔTw) is broadened, there can be obtained an advantage that uniform erasing can be performed even when the speed of the erasing operation is increased. In this case, it is preferable that the first color variation temperature difference width (ΔTw) be 60° C. or more, more preferably 70° C. or more.

An improvement of a reversible thermosensitive recording medium which comprises a matrix resin and an organic low-molecular-weight material dispersed in the matrix resin, of a type that the recording medium becomes transparent when heated to the first temperature range, and becomes milky white when heated to the second temperature range will now be explained.

This improvement can be achieved by using as the organic low-molecular-weight material, an organic low-molecular-weight material comprising a mixture of at least one straight chain compound (A) having a melting point of 130° C. or more, and at least one straight chain compound (B) having a melting point which is lower by at least 20° C. than the melting point of the straight chain compound (A).

It is preferable that the lower limit of the melting point of the straight chain compound (A) be 135° C. or more, more preferably 140° C. or more, for improvement of the erasability of the recording medium, and that the upper limit of the melting point of the straight chain compound (A) be 200° C. or less, more preferably 190° C. or less, furthermore preferably 170° C. or less, for improvement of the printing sensitivity of the recording medium.

It is preferable that the lower limit of the melting point of the straight chain compound (B) be 85° C. or more, more preferably 90° C. or more, furthermore preferably 100° C. or more, for improvement of the heat resistance of the recording medium, and that the upper limit of the melting point of the straight chain compound (B) be less than 120° C., more preferably less than 110° C., for improvement of the erasability of the recording medium.

The above-mentioned organic low-molecular-weight material may further comprise at least one straight chain compound (C) with such a melting point that is higher by at least 10° C. than that of the straight chain compound (B) and is lower by at least 10° C. than that of the straight chain compound (A), whereby image contrast can be improved.

It is preferable that the lower limit of the melting point of the straight chain compound (C) be 100° C. or more, more preferably 110° C. or more, furthermore preferably 120° C. or more, and that the upper limit of the melting point of the straight chain compound (C) be less than 150° C., more preferably less than 140° C., and furthermore preferably less than 130° C.

The above-mentioned straight chain compound (A), straight chain compound (B) and straight chain compound (C) may be individually used alone or in combination of a plurality of different kinds.

It is preferable that each of these straight chain compounds (A), (B) and (C) include a long-chain structure unit. It is preferable that the long-chain structure unit contain at least 4 carbon atoms, more preferably at least 6 carbon atoms, furthermore preferably at least 8 carbon atoms, for obtaining high repeated use durability of the recording medium. The number of the long-chain structure units contained in one molecule of each of the straight chain compounds (A), (B) and (C) may be one or more. In the above, the number of carbon atoms contained in the long-chain structure units means the total of the carbon atoms in the molecule of each of the straight chain compounds (A), (B) and (C). For instance, when one straight chain compound (A), (B) or (C) contains two long-chain structure units each having 6 carbon atoms, the above-mentioned number of carbon atoms is 12, so that the straight chain compound may be defined as a straight chain compound with a long-chain structure unit having 12 carbon atoms.

When the organic low-molecular-weight material comprises a mixture of the straight chain compound (A) and the straight chain compound (B), it is preferable that the lower limit of the amount ratio of the straight chain compound (A) to the entire amount of the organic low-molecular-weight material be 3 wt. % or more, more preferably 5 wt. % or more, furthermore preferably 10 wt. % or more, for improvement of the erasability of the recording medium when images are erased, and that the upper limit of the amount ratio of the straight chain compound (A) to the entire amount of the organic low-molecular-weight material be less than 50 wt. %, more preferably less than 40 wt. %, furthermore preferably less than 30 wt. %, for improvement of the transparency of the recording medium; and it is preferable that the lower limit of the amount ratio of the straight chain compound (B) to the entire amount of the organic low-molecular-weight material be 30 wt. % or more, more preferably 50 wt. % or more, furthermore preferably 60 wt. % or more, for improvement of the erasability of the recording medium, and that the upper limit of the amount ratio of the straight chain compound (B) to the entire amount of the organic low-molecular-weight material be less than 95 wt. %, more preferably less than 90 wt. %, furthermore preferably less than 85 wt. %, for improvement of the transparency of the recording medium when images are erased.

When the straight chain compound (C) is added to the above mixture of the straight chain compound (A) and the straight chain compound (B), it is preferable that the lower limit of the amount ratio of the straight chain compound (C) to the entire amount of the organic low-molecular-weight material be 3 wt. % or more, more preferably 5 wt. % or more, furthermore preferably 10 wt. % or more, for improvement of the transparency of the recording medium, and that the upper limit of the amount ratio of the straight chain compound (C) to the entire amount of the organic low-molecular-weight material be less than 50 wt. %, more preferably less than 40 wt. %, furthermore preferably less than 30 wt. %, for improvement of the erasability of the recording medium.

In the present invention, it is preferable that as the straight chain compound (A), a straight chain compound comprising at least one bond selected from the group consisting of amide bond, urea bond and sulfonyl bond, and at least one carboxyl group, and having a melting point of 130° C. or more.

In the above, each of the amide bond, urea bond and sulfonyl bond may be of the same kind or a different kind, and the straight chain compound (A) may comprise one or a plurality of such bonds either at a terminal of the molecule of the compound (A) or in a central portion of the molecule of the compound (A). The straight chain compound (A) may comprise one or more carboxyl groups either at a terminal of the compound (A) or at a position of a side chain of the compound (A).

It is preferable that the straight chain compound (A) contain an amide bond and a carboxyl group, more preferably at least one amide bond and at least one carboxyl group, furthermore preferably a plurality of amide bonds and a plurality of carboxyl groups.

The following general formula (1) represents the straight chain compound (A) having amide bonds and carboxyl groups for use in the present invention, but the straight chain compound (A) for use in the present invention is not limited to the compound (A) with the general formula (1):

$$HOOC—(CH_2)n-X—(CH_2)m-Y—(CH_2)n-COOH \qquad (1)$$

wherein $1 \leq m \leq 26$, $1 \leq n \leq 26$, and X and Y each independently represent CONH or NHCO, but do not have an identical structure at the same time.

In the above formula (1), it is preferable that (2n+m) be 6 or more, more preferably 8 or more, furthermore preferably 10 or more.

It is preferable that the straight chain compound (A) contain a urea bond and a carboxyl group, or a sulfonyl group and a carboxyl group.

The following general formula (2) represents the straight chain compound (A) having a urea bond and a carboxyl group, or a sulfonyl group and a carboxyl group, but the straight chain compound (A) for use in the present invention is not limited to the compound (A) with the general formula (2):

$$CH_3—(CH_2)n-Z—(CH_2)m-COOH \qquad (2)$$

wherein $1 \leq m \leq 26$, $0 \leq n \leq 25$, and Z represents NHCONH or $SO_2$.

In the above formula (2), it is preferable that (n+m) be 6 or more, more preferably 8 or more, furthermore preferably 10 or more.

It is preferable that the lower limit of the melting point of the straight chain compound (A) of the above general formula (1) be 130° C. or more, more preferably 135° C. or more, furthermore preferably 140° C. or more, for improvement of the erasability of the recording medium, and that the upper limit of melting point of the straight chain compound (A) of the above general formula (1) be 200° C. or less, more preferably 190° C. or less, furthermore preferably 170° C. or less for improvement of the thermal sensitivity of the recording medium.

It is preferable that the lower limit of the melting point of the straight chain compound (A) of the above general formula (2) be 135° C. or more, more preferably 140° C. or more, for improvement of the erasability of the recording medium, and that the upper limit of melting point of the straight chain compound (A) of the above general formula (2) be 190° C. or less, more preferably 180° C. or less, furthermore preferably 170° C. or less, for improvement of the thermal sensitivity of the recording medium.

TABLE 1 and TABLE 2 respectively show specific examples of the straight chain compound (A) of the above general formula (1) and specific examples of the straight chain compound (A) of the above general formula (2).

TABLE 1

| Straight chain compounds (A) represented by general formula (1) | | Melting Point (° C.) |
|---|---|---|
| (1)  | HOOC—$CH_2$—NHCO—$(CH_2)_{10}$—CONH—$CH_2$—COOH | 198 |
| (2)  | HOOC—$(CH_2)_2$—NHCO—$(CH_2)_4$—CONH—$(CH_2)_2$—COOH | 197 |
| (3)  | HOOC—$(CH_2)_2$—NHCO—$(CH_2)_6$—CONH—$(CH_2)_2$—COOH | 189 |
| (4)  | HOOC—$(CH_2)_2$—NHCO—$(CH_2)_{10}$—CONH—$(CH_2)_2$—COOH | 187 |
| (5)  | HOOC—$(CH_2)_3$—NHCO—$(CH_2)_4$—CONH—$(CH_2)_3$—COOH | 139 |
| (6)  | HOOC—$(CH_2)_3$—NHCO—$(CH_2)_6$—CONH—$(CH_2)_3$—COOH | 144 |
| (7)  | HOOC—$(CH_2)_3$—NHCO—$(CH_2)_8$—CONH—$(CH_2)_3$—COOH | 148 |
| (8)  | HOOC—$(CH_2)_3$—NHCO—$(CH_2)_{10}$—CONH—$(CH_2)_3$—COOH | 150 |
| (9)  | HOOC—$(CH_2)_3$—NHCO—$(CH_2)_{12}$—CONH—$(CH_2)_3$—COOH | 156 |
| (10) | HOOC—$(CH_2)_3$—NHCO—$(CH_2)_{18}$—CONH—$(CH_2)_3$—COOH | 151 |
| (11) | HOOC—$(CH_2)_5$—NHCO—$(CH_2)_2$—CONH—$(CH_2)_5$—COOH | 168 |
| (12) | HOOC—$(CH_2)_5$—NHCO—$(CH_2)_4$—CONH—$(CH_2)_5$—COOH | 146 |
| (13) | HOOC—$(CH_2)_5$—NHCO—$(CH_2)_6$—CONH—$(CH_2)_5$—COOH | 138 |
| (14) | HOOC—$(CH_2)_5$—NHCO—$(CH_2)_8$—CONH—$(CH_2)_5$—COOH | 146 |
| (15) | HOOC—$(CH_2)_5$—NHCO—$(CH_2)_{10}$—CONH—$(CH_2)_5$—COOH | 145 |
| (16) | HOOC—$(CH_2)_5$—NHCO—$(CH_2)_{12}$—CONH—$(CH_2)_5$—COOH | 145 |
| (17) | HOOC—$(CH_2)_{11}$—NHCO—$(CH_2)_2$—CONH—$(CH_2)_{11}$—COOH | 144 |
| (18) | HOOC—$(CH_2)_{11}$—NHCO—$(CH_2)_4$—CONH—$(CH_2)_{11}$—COOH | 155 |
| (19) | HOOC—$(CH_2)_{11}$—NHCO—$(CH_2)_6$—CONH—$(CH_2)_{11}$—COOH | 135 |
| (20) | HOOC—$(CH_2)_{11}$—NHCO—$(CH_2)_8$—CONH—$(CH_2)_{11}$—COOH | 144 |
| (21) | HOOC—$(CH_2)_{11}$—NHCO—$(CH_2)_{10}$—CONH—$(CH_2)_{11}$—COOH | 148 |
| (22) | HOOC—$(CH_2)_{11}$—NHCO—$(CH_2)_{12}$—CONH—$(CH_2)_{11}$—COOH | 145 |
| (23) | HOOC—$(CH_2)_2$—CONH—$(CH_2)_{12}$—NHCO—$(CH_2)_2$—COOH | 181 |
| (24) | HOOC—$(CH_2)_4$—CONH—$(CH_2)_{10}$—NHCO—$(CH_2)_4$—COOH | 158 |
| (25) | HOOC—$(CH_2)_4$—CONH—$(CH_2)_{12}$—NHCO—$(CH_2)_4$—COOH | 159 |
| (26) | HOOC—$(CH_2)_5$—CONH—$(CH_2)_8$—NHCO—$(CH_2)_5$—COOH | 143 |
| (27) | HOOC—$(CH_2)_7$—CONH—$(CH_2)_6$—NHCO—$(CH_2)_7$—COOH | 164 |
| (28) | HOOC—$(CH_2)_{10}$—CONH—$(CH_2)_4$—NHCO—$(CH_2)_{10}$—COOH | 168 |

TABLE 2

| Straight chain compounds (A) represented by general formula (2) | | Melting Point (° C.) |
|---|---|---|
| (29) | $CH_3(CH_2)_{17}$—NHCONH—$CH_2$—COOH | 143 |
| (30) | $CH_3(CH_2)_{17}$—NHCONH—$(CH_2)_2$—COOH | 140 |
| (31) | $CH_3(CH_2)_{17}$—NHCONH—$(CH_2)_3$—COOH | 130 |
| (32) | $CH_3(CH_2)_{13}$—NHCONH—$(CH_2)_2$—COOH | 136 |
| (33) | $CH_3(CH_2)_{17}$—$SO_2$—$(CH_2)_2$—COOH | 136 |

Synthesis Example 1
[Synthesis of Compound (15) of Straight Chain Compound (A) Represented by General Formula (1): HOOC—$(CH_2)_5$—NHCO—$(CH_2)_{10}$—CONH—$(CH_2)_5$—COOH]

81.6 g of 5-ethyl aminocapronate-hydrochloride, 33.0 g of pyridine, 32.0 g of dodecanedioic acid, and 63.9 g of 1-hydroxybenzotriazole were dissolved in 500 ml of tetrahydrofuran.

To this solution, 52.5 g of diisopropyl-carbodiimide was added dropwise at room temperature. The reaction mixture was refluxed with stirring for 3 hours. 800 ml of a solution of 169.3 g of sodium hydroxide in a 90% aqueous solution of ethanol was added to the reaction mixture. This mixture was refluxed with stirring for 4 hours. This reaction mixture was made acidic with addition of 4N hydrochloric acid thereto. Crystals which separated out in the mixture were filtered off, washed with water, dried, and recrystallized from dimethylformamide, whereby the desired Compound (15) was obtained in a yield of 29.7 g.

Compounds (1) to (14) and (16) to (22) of straight chain compound (A)represented by general formula (1) can be obtained in the same procedure as in the above, provided that the starting materials therefor are appropriately replaced.

Synthesis Example 2
[Synthesis of Compound (24) of Straight Chain Compound (A) Represented by General Formula (1): HOOC—$(CH_2)_4$—CONH$(CH_2)_{10}$—NHCO—$(CH_2)_4$—COOH]

10.0 g of monoethyl adipate, 48.8 g of 1,10-diaminodecane and 35.8 g of 1-hydroxybenzotriazole were dissolved in 1200 ml of tetrahydrofulan. To this solution was added dropwise 29.4 g of diisopropyl-carbodiimide at room temperature. The reaction mixture was refluxed with stirring for 5 hours. To this reaction mixture, a solution of 113.7 g of sodium hydroxide in a 90% aqueous solution of ethanol was added. The reaction mixture was then refluxed for 4 hours.

The reaction mixture was made acidic with addition of 4N hydrochloric acid thereto. Crystals which separated out in the mixture were filtered off, washed with water, dried, and recrystallized from dimethylformamide, whereby the desired Compound (24) was obtained in a yield of 16.4 g.

Synthesis Example 3
[Synthesis of Compound (30) of Straight Chain Compound (A) Represented by General Formula (2): $CH_3$—$(CH_2)_{17}$—NHCONH—$(CH_2)_2$—COOH]

23.9 g of sodium salt of β-alanine and 35.5 g of octadecyl isocyanate were added to 900 ml of 2-butanone. This reaction mixture was refluxed with stirring for 6 hours.

Crystals which separated out in the mixture were filtered off and washed with water. The crystals were then added to an aqueous solution of acetic acid. The mixture was stirred for 3 hours. The crystals were filtered off, washed with water and dried. The crystals were then recrystallized from toluene, whereby the desired Compound (30) was obtained in a yield of 25.7 g.

Synthesis Example 3

[Synthesis of Compound (33) of Straight Chain Compound (A) Represented by General Formula (2): $CH_3$—$(CH_2)_{17}$—$SO_2$—$(CH_2)_2$—COOH]

75.6 g of 1-octadecene and 26.8 g of thiopropionic acid were added to 200 ml of 2-butanone. This reaction mixture was refluxed with stirring for 12 hours. Water was added to this reaction mixture. Crystals which separated out in the mixture were filtered off, washed with water. The crystals were added to 500 ml of acetic acid. To the mixture was added dropwise 450 ml of a 30% aqueous solution of hydrogen peroxide at 80 to 90° C., and the mixture was stirred for 10 hours. Crystals which were separated out in the mixture were filtered off, washed with water and recrystallized from isopropanol, whereby the desired Compound (33) was obtained in a yield of 32.7 g.

As the straight chain compound (B) for use in the present invention, any straight chain compound can be employed as long as the melting point thereof is in the above range and the compound contains a long-chain structure unit. It is preferable that the lower limit of the number of carbon atoms contained in the long-chain structure unit be 8 or more, more preferably 10 or more, furthermore preferably 12 or more, and that the upper limit of the number of carbon atoms contained in the long-chain structure unit be 50 or less, more preferably 40 or less, furthermore preferably 30 or less.

Specific examples of the straight chain compound (B) for use in the present invention are alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cycloalkynes; saturated or unsaturated monocarboxylic acids, and esters, amides and ammonium salts thereof; saturated or unsaturated halogenated fatty acids and esters, amides and ammonium salts thereof; allylcarboxylic acids, and esters, amides and ammonium salts thereof; halogenated allylcarboxylic acids, and esters, amides and ammonium salts thereof; thioalcohols; thiocarboxylic acids, and esters, amines and ammonium salts thereof; and carboxylic acid esters of thioalcohol. These materials can be used alone or in combination.

It is preferable that the number of carbon atoms of the above-mentioned straight chain compounds be in the range of 10 to 60, more preferably in the range of 10 to 38, furthermore preferably in the range of 10 to 30. Part of the alcohol groups in the esters may be saturated or unsaturated, and further may be substituted by a halogen.

In any case, it is preferable that the organic low-molecular weight material have at least one atom selected from the group consisting of oxygen, nitrogen, sulfur and a halogen atom in the molecule thereof. More specifically, it is preferable that the organic low-molecular weight material comprise in the molecule thereof, for instance, —OH, —COCH, —CONH, —COOR, —NH, —$NH_2$, —S—, —S—S—, —O— or a halogen atom.

Specific examples thereof are aliphatic monocarboxylic acid, aliphatic dicarboxylic acid, fatty acid esters, ketones having higher alkyl group, dibasic acid esters, difatty acid ester of polyhydric alcohol, fatty acid monoamide, and other materials represented by the following general formulas (3) and (4), but are not limited to such compounds.

$$CH_3(CH_2)n\text{-}X\text{-}(CH_2)m\text{-}COOH \quad (3)$$

wherein $0 \leq n \leq 26$, $0 \leq m \leq 26$, provided that $n+m \geq 10$; Z represents NHCONH, $SO_2$, and CONH or NHCO, and the melting point of the material represented by the general formula (3) is less than 130° C.

$$HOOC\text{-}(CH_2)n\text{-}NHCO\text{-}(CH_2)m\text{-}COOH \quad (4)$$

wherein $0 \leq n \leq 26$, $0 \leq m \leq 26$, provided that $n+m \geq 10$, and the melting point of the material represented by the general formula (4) is less than 130° C.

Specific examples of the aliphatic monocarboxylic acid are cerotic acid, montanic acid, and melissic acid.

Specific examples of the aliphatic dicarboxylic acids are succinic acid, glutaric acid, adipic acid, pimelic acid, suberic acid, azelaic acid, sebacic acid, undecanedioic acid, dodecanedioic acid, tetradecanedioic acid, pentadecanedioic acid, hexadecanedioic acid, heptadecanedioic acid, octadecanedioic acid, nonadecanedioic acid, eicosanedioic acid, heneicosanedioic acid, and docosanedioic acid.

Specific examples of the material represented by the above-mentioned general formula (3) or (4) are shown in TABLE 3 and TABLE 4.

TABLE 3

| | Examples of the material represented by general formula (3) | Melting Point (° C.) |
|---|---|---|
| (34) | $CH_3(CH_2)_{13}$—NHCONH—$(CH_2)_5$—COOH | 117 |
| (35) | $CH_3(CH_2)_{13}$—NHCONH—$(CH_2)_7$—COOH | 118 |
| (36) | $CH_3(CH_2)_{17}$—NHCONH—$(CH_2)_5$—COOH | 119 |
| (37) | $CH_3(CH_2)_{17}$—NHCONH—$(CH_2)_7$—COOH | 120 |
| (38) | $CH_3(CH_2)_{17}$—NHCONH—$(CH_2)_{10}$—COOH | 122 |
| (39) | $CH_3(CH_2)_{17}$—$SO_2$—$CH_2$—COOH | 118 |
| (40) | $CH_3(CH_2)_{19}$—$SO_2$—$CH_2$—COOH | 120 |
| (41) | $CH_3(CH_2)_{16}$—CONH—$CH_2$—COOH | 122 |
| (42) | $CH_3(CH_2)_{16}$—CONH—$(CH_2)_2$—COOH | 120 |
| (43) | $CH_3(CH_2)_{20}$—CONH—$CH_2$—COOH | 125 |
| (44) | $CH_3(CH_2)_{11}$—NHCO—$(CH_2)_4$—COOH | 109 |
| (45) | $CH_3(CH_2)_{17}$—NHCO—$(CH_2)_4$—COOH | 108 |

TABLE 4

| | Examples of the material represented by general formula (4) | Melting Point (° C.) |
|---|---|---|
| (46) | HOOC—$(CH_2)_{11}$—NHCO—$(CH_2)_2$—COOH | 127 |
| (47) | HOOC—$(CH_2)_{11}$—NHCO—$(CH_2)_4$—COOH | 123 |

Specific examples of the fatty acid monoamide are represented by the following general formula (5):

$$R^1\text{-}CONH\text{-}R^2 \quad (5)$$

wherein $R^1$ is a straight-chain hydrocarbon chain having 1 to 25 carbon atoms; R is a hydrogen atom, a straight-chain hydrocarbon chain having 1 to 26 carbon atoms, or methylol group; and at least one of $R^1$ or $R^2$ is a straight-chain hydrocarbon chain having 10 or more carbon atoms.

Specific examples of the fatty acid monoamide are nonaneamide, decaneamide, undecaneamide, dodecaneamide, tridecaneamide, tetradecaneamide, hexadecaneamide, octadecaneamide, eicosaneamide, docosaneamide, tricosaneamide, hexacosaneamide, and octacosanamide.

As mentioned above, in the above reversible thermosensitive recording medium of the present invention, the organic low-molecular-weight material may further comprise at least one straight chain compound (C) in the mixture, having a melting point which is higher by at least 10° C. than that of the straight chain compound (B) and is lower by at least 10° C. than that of the straight chain compound (A). The straight chain compound (C) may be selectively used from the examples of the above-mentioned straight chain compound (B).

The matrix resin used in the reversible thermosensitive recording layer serves to form a layer in which the organic low-molecular-weight material is uniformly dispersed and held, and has an effect on the transparency of the reversible thermosensitive recording layer when the recording layer exhibits a maximum transparency.

As the material for the matrix resin, it is preferable to employ a resin having high transparency, mechanical stableness, and excellent film formation properties.

As such resins for use as the matrix resin, there can be employed polyvinyl chloride; vinyl chloride copolymers such as vinyl chloride—vinyl acetate copolymer, vinyl chloride—vinyl acetate—vinyl alcohol copolymer, vinyl chloride—vinyl acetate—maleic acid copolymer, vinyl chloride—acrylate copolymer; polyvinylidene chloride; vinylidene chloride copolymers such as vinylidene chloride—vinyl chloride copolymer, and vinylidene chloride—acrylonitrile copolymer; polyester; polyamide; polyacrylate or polymethacrylate, or acrylate or methacrylate copolymers; and silicone resin. These resins can be employed alone or in combination.

It is preferable that the above resins for use in the recording layer be cross-linked. This is because when a cross-linked resin is employed as the matrix resin in the recording layer, even if image formation or printing and erasure thereof are repeated, the internal structure of the recording layer is difficult to change and the white opaqueness and the transparency of the recording layer are not lowered while in repeated use, thus the repeated use durability of the recording medium is significantly improved.

For cross-linking, the resin preferably comprises a functional group such as hydroxyl group, carboxyl group or epoxy group.

The cross-linking can be performed by heat application, UV (ultraviolet light) irradiation or EB (electron beam) irradiation. It is preferable that the cross-linking be carried out with the addition of a cross-linking agent selected from cross-linking agents such as isocyanate and a variety of acrylic cross-linking agents.

It is preferable that the lower limit of the glass transitional temperature (Tg) of the matrix resin be 70° C. or more, more preferably 80° C. or more, furthermore preferably 90° C. or more. The higher the glass transitional temperature of the matrix resin, the more improved the heat resistance of images formed on the recording material.

It is preferable that the thickness of the reversible thermosensitive recording layer be in the range of 1 to 30 $\mu$m, more preferably in the range of 2 to 20 $\mu$m, and furthermore preferably in the range of 4 to 15 $\mu$m. When the reversible thermosensitive recording layer is excessively thick, the thermal distribution in the recording layer becomes non-uniform, so that it becomes difficult to make the recording layer uniformly transparent. On the other hand, when the reversible thermosensitive recording layer is too thin, the degree of milky white opaqueness of the recording layer is decreased, so that the image contrast is lowered. The degree of milky white opaqueness of the recording layer can be increased by increasing the amount of the organic low-molecular-weight material such as fatty acids in the recording layer.

It is preferable that the amount ratio by weight of the organic low-molecular-weight material to the resin having a cross-linking structure be in the range of about (2:1) to (1:16), more preferably in the range of (1:2) to (1:8), still more preferably in the range of (1:2) to (1:5), furthermore preferably in the range of (1:2) to (1:4). The amount ratio by weight of the organic low-molecular-weight material to the resin in the range of (1:2.5) to (1:4) is most preferable. When the amount ratio by weight of the resin is lower than the lower limit thereof in the above range, it is difficult to form a layer with the organic low-molecular-weight material held in the resin, while when the amount ratio by weight of the resin exceeds the upper limit thereof in the above range, it is difficult to make the recording layer milky white due to an insufficient amount of the organic low-molecular-weight material.

Further, a protective layer may be provided on the reversible thermosensitive recording layer in order to protect the recording layer.

Examples of the material for the protective layer (with a thickness of 0.1 to 5 $\mu$m) include silicone rubber and silicone resin (as disclosed in Japanese Laid-Open Patent Application 63-221087), polysiloxane graft polymer (as disclosed in Japanese Laid-Open Patent Application 62-152550), and ultraviolet curing resin and electron beam ion curing resin (as disclosed in Japanese Laid-Open Patent Application 63-310600).

The protective layer may further comprise an organic or an inorganic filler.

In order to protect the reversible thermosensitive recording layer from a solvent and/or monomer component which is contained in the protective layer formation liquid, an intermediate layer may be interposed between the protective layer and the reversible thermosensitive recording layer, as disclosed in Japanese Laid-Open Patent Application 1-133781. As the materials for the intermediate layer, the same materials as those for the matrix resin for the reversible thermosensitive recording layer can be employed. In addition to those materials, the following thermosetting resins, thermoplastic resins, UV (ultraviolet) curing resin and EB (electron beam) irradiation curing resin can be employed.

Specific examples of such resins are polyethylene, polypropylene, polystyrene, polyvinyl alcohol, polyvinyl butyral, polyurethane, saturated polyester, unsaturated polyester, epoxy resin, phenolic resin, polycarbonate, and polyamide.

It is preferable that the intermediate layer have a thickness in the range of about 0.1 to 2 $\mu$m. When the intermediate layer is excessively thin, the protective effect of the intermediate layer tends to be decreased, while the intermediate layer is excessively thick, the thermosensitivity of the recording layer is decreased.

The reversible thermosensitive recording medium of the present invention, which comprises the support, and the reversible thermosensitive recording layer formed thereon comprising the matrix resin and the organic low-molecular-weight material dispersed in the matrix resin, of which transparency is reversibly changeable depending upon the temperature thereof, can be fabricated by a method comprising the steps of:

coating on the support a dispersion comprising a solvent, the matrix resin and the organic low-molecular-weight material comprising an organic low-molecular-weight compound having a melting point of 130° C. or more, which organic low-molecular-weight material is dispersed in the form of a solid in the matrix resin, and drying the dispersion with application of heat thereto so as to dissolve the organic low-molecular-weight material in the solvent when heat is applied thereto, thereby forming the reversible thermosensitive recording layer on the support.

It is preferable that the above-mentioned organic low-molecular-weight material comprise a mixture of at least two organic low-molecular-weight compounds of which melting points are different by at least 20° C. Organic low-molecular-weight compounds usually tend to become slightly soluble in ordinary solvents as the melting point thereof increases. In particular, when the melting point exceeds 130° C., this tendency becomes conspicuous.

When a coating liquid is prepared by dispersing in an ordinary solvent the above-mentioned organic low-molecular-weight compound which is slightly soluble in the ordinary solvent, together with a resin, and coated to form a coating layer with the application of heat and dried so as to dissolve the organic low-molecular-weight compound in the solvent, there can be formed a layer with the same structure as that of a conventional layer which is prepared by dissolving an organic low-molecular-weight material in a solvent together with a resin at room temperature to prepare a solution and coating the solution and drying the coated solution, in which layer the organic low-molecular -weight compound is dispersed in the form of finely-divided spherical particles in the resin.

When the organic low-molecular-weight material comprise a mixture of at least two organic low-molecular-weight compounds as mentioned above, there can be obtained a reversible thermosensitive recording medium having a broad transparentizing temperature width, which is capable of producing images with high contrast between a transparent state and an opaque state, of which temperature control for forming the transparent state and the opaque state repeatedly is easy.

A mixed solvent composed of two or more solvents may be employed for dispersing the organic low-molecular-weight compounds. In this case, it is preferable that at least one of the solvents have a boiling point as high as 100° C. or more. By use of such a solvent, there can be obtained a reversible thermosensitive recording medium capable of producing images with higher contrast between the transparent state and the opaque state.

It is particularly preferable that the mixing ratio of the solvent having the higher boiling point in the mixed solvent be 10 wt. % or more with respect to the entire weight of the mixed solvent. This is because when the mixing ratio of the solvent having the higher boiling point is this range, the shape of a domain of a matrix resin or the shape of a domain of the organic low-molecular-weight material comprising at least two organic low-molecular-weight compounds can be made spherical, oval or rounded, whereby there can be obtained a reversible thermosensitive recording medium which is capable of producing images with high contrast between the transparent state and the opaque state repeatedly.

When the above-mentioned method of producing the reversible thermosensitive recording medium is employed, it is preferable to employ a low-molecular-weight organic material which is soluble in the solvent at a temperature at which the dispersion thereof is coated on the support and dried with application of heat thereto. In particular, it is preferable that the low-molecular-weight organic material have a solubility of 0.5% or more in the solvent at a temperature at which the dispersion coated on the support is dried with application of heat thereto, and also have a solubility of less than 0.5% in the solvent at room temperature.

It is preferable that the low-molecular-weight organic material have an average dispersed particle diameter be 50 $\mu$m or less, more preferably 30 $\mu$m or less, furthermore preferably 10 $\mu$m or less, and most preferably 5 $\mu$m or less.

When such organic low-molecular-weight material is used, the organic low-molecular-weight material is once dissolved in the solvent, enters a phase separation step and then forms a domain of the organic low-molecular-weight material in which two or more organic low-molecular-weight compounds coexist in the dispersion liquid when dried.

The reversible thermosensitive recording medium of the present invention, which comprises the support, and the reversible thermosensitive recording layer formed thereon comprising the matrix resin and the organic low-molecular-weight material dispersed in the matrix resin, of which transparency is reversibly changeable depending upon the temperature thereof, can also be fabricated by a method comprising the steps of:

coating on the support a dispersion comprising a solvent, the matrix resin and the organic low-molecular-weight material comprising (a) an organic low-molecular-weight compound and (b) an organic low-molecular-weight compound having a melting point of 130° C. or more, which organic low-molecular-weight material is dispersed in the form of a solid in the matrix resin, and drying the dispersion with application of heat thereto at a temperature which is lower than the highest melting point of the melting points of the organic low-molecular-weight compounds, and then at a temperature which is not lower than the highest melting point of the melting points of the organic low-molecular-weight compounds, thereby forming the reversible thermosensitive recording layer on the support.

In the above method, it is preferable that the above-mentioned organic low-molecular-weight material comprise a mixture of at least two organic low-molecular-weight compounds of which melting points are different by at least 20° C.

When the dispersion of the above-mentioned organic low-molecular-weight material is coated on the support and dried, and the reversible thermosensitive recording layer is prepared and then subjected to the heat treatment at a temperature which is not lower than the highest melting point of the melting points of the organic low-molecular-weight compounds, there can be obtained a reversible thermosensitive recording medium which has a broad transparentizing temperature width and is capable of producing images with high contrast between a transparent state and an opaque state repeatedly, of which temperature control for forming the transparent state and the opaque state repeatedly is easy.

By subjecting the reversible thermosensitive recording layer to such heat treatment, the two or more organic low-molecular-weight compounds which are individually dispersed in the matrix resin in the reversible thermosensitive recording layer are fused and caused to thermally expand, and the matrix resin is softened to be joined together with the organic low-molecular-weight material, so that organic low-molecular-weight material domains in which the above-mentioned two or more organic low-molecular-weight compounds coexist are formed.

Furthermore, by subjecting the reversible thermosensitive recording layer to the above-mentioned heat treatment, the shape of the resin matrix or the shape of the above-mentioned organic low-molecular-weight material domains become spherical, oval or rounded, whereby there can be obtained the reversible thermosensitive recording medium which is capable of producing images with high contrast between the transparent state and the opaque state repeatedly a number of times. It is preferable that the ratio of the number of the spherical, oval or rounded resin matrixes or organic low-molecular-weight material domains be 10% or more to the total number of the resin matrixes or organic low-molecular-weight material domains.

In the above-mentioned method of producing the reversible thermosensitive recording medium, when two or more organic low-molecular-weight compounds are used in combination, one of the organic low-molecular-weight compounds may be used to be dispersed in the solvent, while the other may be used by being dissolved in the solvent at room temperature.

According to the present invention, a card comprising a reversible thermosensitive recording portion which comprises the above-mentioned reversible thermosensitive recording medium and an information memory portion can be provided. When part of information recorded in the information memory portion is displayed in the reversible thermosensitive recording portion, the user of the card can visually identify the information easily without using a particular apparatus. The information memory portion may be any element as long as necessary information can be stored. For instance, the information memory portion may comprise a magnetic recording layer, IC or an optical memory, which may be provided either on the same side as or on an opposite side to the reversible thermosensitive recording portion.

The magnetic recording layer can be formed on a support by coating a mixture of a conventionally employed magnetic material such as iron oxide or barium ferrite, and a resin such as vinyl chloride resin, urethane resin or nylon resin, or by sputtering the above-mentioned magnetic material on the support, without using the resin.

The magnetic recording layer for the information memory portion can be provided on a back side of the support opposite to the reversible thermosensitive recording portion with respect to the support, or between the support and the reversible thermosensitive recording portion, or on part of the reversible thermosensitive recording portion.

The reversible thermosensitive material for use in the reversible thermosensitive recording layer may be employed in the form of bar codes or two-dimensional codes for the information memory portion.

Of the above-mentioned elements for use in the information memory portion, the magnetic recording layer and IC are particularly preferable.

Furthermore, in the reversible thermosensitive recording medium of the present invention, it is also possible to apply an adhesive layer or a tacky layer to the back side of the support opposite to the thermosensitive recording layer of the reversible thermosensitive recording medium in order to use the reversible thermosensitive recording medium as a reversible thermosensitive recording label.

Any conventional materials can be used for the formation of the adhesive layer or the tacky layer.

Specific examples of materials for use in the adhesive layer or tacky layer are urea resin, melamine resin, phenolic resin, epoxy resin, polyvinyl acetate resin, vinyl acetate—acrylic copolymer, ethylene—vinyl acetate copolymer, acrylic resin, polyvinyl ether resin, vinyl chloride—vinyl acetate copolymer, polystyrene resin, polyester resin, polyurethane resin, polyamide resin, chlorinated polyolefin resin, polyvinyl butyral resin, acrylic ester copolymer, methacrylic ester copolymer, natural rubber, cyanoacrylate resin, silicone resin, but are not limited to these materials. The materials for use in the adhesive layer and the tacky layer may be a hot-melt type. The reversible thermosensitive recording label of the present invention may be used either with a disposable release paper or without a disposable release paper.

By the provision of the adhesive layer or the tacky layer, the reversible thermosensitive recording layer can be easily applied to the entire surface or part of the surface of a thick substrate, such as a polyvinyl chloride card with magnetic stripes, to which the application of the reversible thermosensitive recording layer is usually otherwise difficult, whereby part of information magnetically recorded in the card can be displayed in the reversible thermosensitive recording layer and thus the reversible thermosensitive recording medium of the present invention can be used with this advantage.

The reversible thermosensitive recording label provided with the adhesive layer or the tacky layer can be applied not only to the above-mentioned magnetic card, but also to thick cards such as IC cards and optical memory cards.

The above-mentioned thermosensitive recording label can also be applied to the external surface of a disk cartridge in which a rewritable disk is built, such as a floppy disk, MD and DVD-RAM, as a display label.

Figure 4:
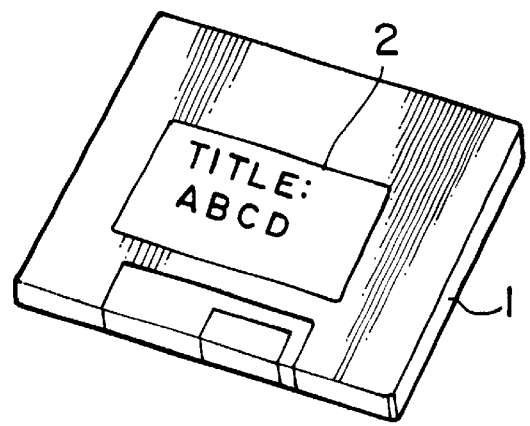
FIG. 4 is a schematic perspective view of an example of a MD cartridge with a reversible thermosensitive recording label of the present invention applied to the external surface thereof.

FIG. 4 is a perspective view of an example of a MD cartridge 1 with a reversible thermosensitive recording label 2 applied to the external surface of the cartridge 1.

Figure 5:
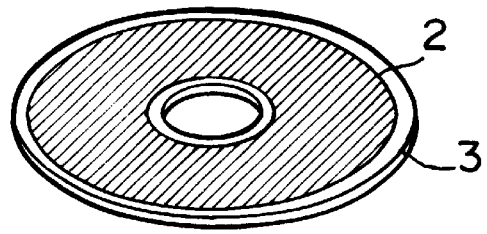
FIG. 5 is a schematic perspective view of an example of a MD disk with a reversible thermosensitive recording label of the present invention applied to the external surface thereof.

In the case of a compact disk 3 such as CD-RW without using the above-mentioned cartridge, the reversible thermosensitive recording label 2 can be directly applied to the surface of the compact disk 3 such a s CD-RW as shown in FIG. 5. The reversible thermosensitive recording label 2 applied to the compact disk 3 can be used in such a manner that the information displayed on the recording label 2 can be automatically rewritten in accordance with the contents of the information recorded in the compact disk 3. In particular, when the compact disk 3 is a write once disk such as a CD-R and the information recorded in the compact disk 3 is changed, for instance, with the addition of new information, the information displayed on the recording label 2 can be changed so as to indicate the change in part of the information recorded in the compact disk 3.

Figure 6:
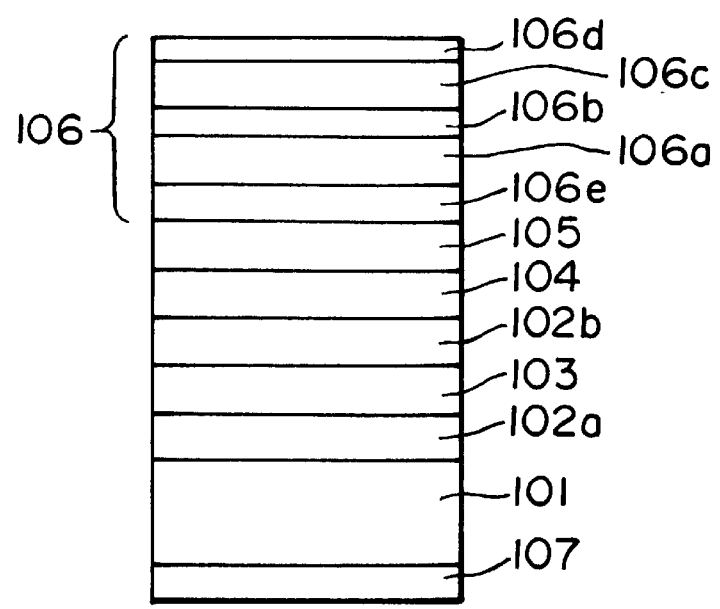
FIG. 6 is a schematic cross-sectional view of an example of an optical information recording medium (CD-RW) comprising an AgInSbTe based phase changeable recording material and a reversible thermosensitive recording label of the present invention.

FIG. 6 is a schematic cross-sectional view of an example of an optical information recording medium (CD-RW) using an AgInSbTe based phase changeable recording material and the above-mentioned reversible thermosensitive recording label.

As shown in FIG. 6, the optical information recording medium (CD-RW) is basically composed of a substrate 101 with a guide groove (not shown), and a first dielectric layer 102a, an optical information recording layer 103, a second dielectric layer 102b, a reflective heat dissipation layer 104 and an intermediate layer 105, which are successively overlaid on the substrate 101. On the back side of the substrate 101 opposite to the first dielectric recording layer 102a, there is provided a hard coat layer 107. Furthermore, a reversible thermosensitive recording label 106 is applied to the intermediate layer 105. The reversible thermosensitive recording label 106 is composed of a support 106a, and a light reflection layer 106b, a reversible thermosensitive recording layer 106c and a protective layer 106d which are successively overlaid on the support 106a, and an adhesive or tacky layer 106e which is provided on the back side of the support 106a opposite to the light reflection layer 106b with respect to the support 106a, and adheres to the intermediate layer 105.

It is not always necessary to provide one of the first or second dielectric layers 102a and 102b on either opposite side of the optical information recording layer 103. However, when the substrate 101 is not heat resistant, for example, when the substrate is made of polycarbonate resin, it is preferable to provide the first dielectric protective layer 102a as shown in FIG. 6.

Figure 7:
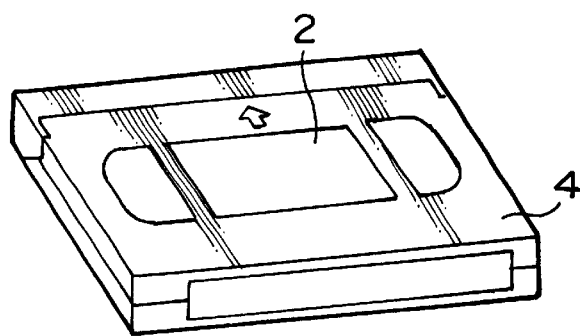
FIG. 7 is a schematic perspective view of an example of a video tape cassette with a reversible thermosensitive recording label of the present invention applied to the external surface thereof.

The above-mentioned thermosensitive recording label can also be applied to the external surface of a video tape cassette as a display label as illustrated in FIG. 7.

The thermosensitive recording label can be applied to the external surface of the video tape cassette in the same manner as with the above-mentioned thick card, disk cartridge and disk. Alternatively, the thermosensitive recording layer may be directly applied to the external surface of a video tape cassette, or the thermosensitive recording layer may be formed on a support, and then the thermosensitive recording layer may be transferred from the support to the external surface of the video tape cassette. When such transfer of the thermosensitive recoridng layer is performed, a hot-melt type adhesive layer or tacky layer may be provided on the reversible thermosensitive recording layer before the transfer.

When the reversible thermosensitive recording label is applied to a rigid material such as the hard cards, the disk, the disk cartridge and the video tape cassette, or the reversible thermosensitive recording layer is provided on such a rigid material, it is preferable to provide an elastic layer or sheet which serves as a cushion between the recording label or the recording layer and the surface of the rigid material in order to improve the contact of a thermal head with the recording label or the recording layer provided on the rigid material.

When the reversible thermosensitive recording medium of the present invention is provided with a rewritable bar code, it is preferable to provide behind the bar code a back layer which regularly reflects light, whereby the degree of the milky white opaqueness in the milky white opaque portions of the bar code in the recording medium and the contrast thereof can be improved. As such a back layer, a metal layer and a metal deposited layer, made of Al, are preferable.

When the reversible thermosensitive recording medium of the present invention is provided with an information memory portion in the form of a bar code which is formed by the reversible thermosensitive material for the recording medium, it is preferable to provide behind the bar code portion of the recording medium a back sheet which regularly reflects light, and a portion for images, characters and figures which can be recognized by eye. Specifically, the above back sheet is provided behind the bar code, and a light-absorbing layer, such as a colored layer, is provided behind the portion for images, characters and figures which can be recognized by eye. This is because when the portion is visually inspected, there is not only a difference in light quantity between an image area in a milky white opaque state and a non-image area with the same color as that of the colored layer of the back sheet, but also a difference in color tone therebetween, so that images, characters and figures can be easily seen since there is no glare, that is, no excessive light reflected from the non-image area behind which the colored portion is placed. On the other hand, when the bar code is read by a reflection densitometer or a bar code reader, a light beam is projected from an inclined angle with respect to the surface of the bar code, and a sensor of the reflection densitometer or the bar code reader senses the light reflected vertically from the surface of the bar code, so that the reflection densitometer or the bar code reader detects part of the incident light with a reduced contrast. For this purpose, the light reflected, for instance, by the above-mentioned aluminum metal portion with a particular metallic reflectivity, is suitable for the detection by the reflection densitometer or the bar code reader, although the light reflected by the above-mentioned aluminum metal portion is not suitable for the visual inspection.

In order to obtain a sufficiently high contrast for reading the bar code formed in the reversible thermosensitive recording layer, it is preferable that the organic low-molecular-weight material have an average particle size in the range of 0.1 to 2.0 $\mu$m, since when the average particle size of the organic low-molecular-weight material is in the above-mentioned range, an appropriate degree of milky white opaqueness can be obtained.

It is considered that as the average particle size of the organic low-molecular-weight material is increased, it becomes more difficult for the organic low-molecular-weight material to assume a polycrystalline state, so that the light scattering effect of the organic low-molecular-weight is reduced and accordingly the degree of milky white opaqueness obtained by the organic low-molecular-weight material is reduced and image contrast obtained is lowered. On the other hand, as the average particle size of the organic low-molecular-weight material is reduced, it becomes more difficult for the organic low-molecular-weight material dispersed in the matrix resin to assume a polycrystalline state in the crystalline growth thereof, so that the light scattering effect of the organic low-molecular-weight is also reduced and accordingly the degree of milky white opaqueness obtained by the organic low-molecular-weight material is reduced and image contrast obtained is lowered.

The image contrast at the time of reading the bar code is improved when the average particle size of the particles of the organic low-molecular-weight material is in the range of $\frac{1}{8}$ to 2 times the wavelength of a light of a light source for reading the bar code. It has not yet been clarified why such a phenomenon takes place, but it is assumed that this probably takes place in accordance with the following mechanism.

The degree of milky white opaqueness of the reversible thermosensitive recording layer, that is, the degree of light scattering of the recording layer, is considered to be determined in accordance with the size of the crystals of the organic low-molecular-weight material in the particles thereof. Furthermore, the size of the crystals of the organic low-molecular-weight material in the particles thereof is considered to be determined in accordance with the size of the particles of the organic low-molecular-weight material. This is because it is considered that the area of the interfaces between the organic low-molecular-weight material dispersed in the matrix resin and the matrix resin is determined depending upon the size of the particles of the organic low-molecular-weight material, and the magnitude of the mutual action between the matrix resin and the organic low-molecular-weight material is determined depending upon the area of the above-mentioned interfaces.

There is a particular size of a crystal at which size the crystal scatters light most. The size differs depending upon the kind of the material of the crystal, but a crystal with a size smaller than the wavelength of light is apt to scatter the light.

In other words, it is considered that when the average particle size of the particles of the organic low-molecular-weight material is in the range of $\frac{1}{8}$ to 2 times the wavelength of the light for reading the bar code, individual polycrystals in the particles of the organic low-molecular-weight material in a milky white state are in such a size that the light with the wavelength is scattered most. When the average particle size of the particles of the organic low-molecular-weight material is in less than ⅛ the wavelength of the light for reading the bar code, the light scattering effect is reduced, and accordingly the degree of milky white opaqueness and the image contrast are lowered. On the other hand, when the average particle size of the particles of the organic low-molecular-weight material is more than 2 times the wavelength of the light for reading the bar code, the area of the interfaces between the matrix resin and the organic low-molecular-weight material is reduced, and the mutual action between the matrix resin and the organic low-molecular-weight material is also reduced, so that it is difficult to control the particle size of the crystals of the organic low-molecular-weight material in the particles thereof and accordingly the degree of milky white opaqueness and the image contrast are lowered.

It is considered that the particle size of the organic low-molecular-weight material can be controlled by a method of mixing the organic low-molecular-weight material with a poor solvent, a method of controlling the heat application and drying temperature in the course of a coating process of a recording layer formation liquid containing the organic low-molecular-weight material, and a method of adding to the organic low-molecular-weight material a surfactant for controlling the dispersibility.

Conventionally, it is regulated that the wavelength of light for reading bar codes be 600 nm or more by the Japanese Industrial Standards (JIS B9550). Usually, light sources with a wavelength in the range of 600 nm to 1000 nm are employed for reading bar codes. Specific examples of such light sources are LED such as LED with a wavelength of 660 nm and LED with a wavelength of 940 nm which are widely used, and laser such as He-Ne laser with a wavelength of 600 nm, and semiconductor lasers with a wavelength of 680 nm, a wavelength of 780 nm, and a wavelength of 960 nm which are widely used.

As a matter of course, the bar code display member using the reversible thermosensitive recording medium of the present invention can be read by using a light source with a light having a wavelength of 660 nm or more. A light source with a shorter wavelength can also be used with the bar code display member using the reversible thermosensitive recording medium of the present invention, and a higher contrast can be obtained when such light source with a shorter wavelength. More specifically, for example, when light with a wavelength of 400 to less than 600 nm is employed for reading the bar code, a maximum image contrast obtained by the light is about 2 times an image contrast obtained by light with a wavelength of 600 nm to 10000 nm. It is considered that this is because the organic low-molecular-weight material has a greater refractive index with respect to the light with a shorter wavelength than a refractive index with respect to the light with a longer wavelength, so that the light scattering is increased, and accordingly the degree of milky white opaqueness is also increased.

The "bar code" mentioned here means any optical recognition pattern display member which is capable of recognizing changes in optical properties such as the intensity of light and changes of wavelength as the information to be read, regardless of the wavelength, such as the wavelength of visible light. The "bar code" includes other optical recognition pattern display member such as two-dimensional bar codes, optical character recognition (OCR) patterns, and a code consisting of four distinguishable areas capable of representing sixteen different types of information in total, namely, calra.

Figure 8A:
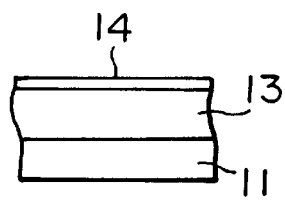
FIG. 8a is a schematic cross-sectional view of an example of a reversible thermosensitive recording medium film of the present invention.

FIG. 8a is a schematic cross-sectional view of an example of a reversible thermosensitive recording medium film of the present invention, which comprises a support 11, a reversible thermosensitive recording layer 13 provided on the support 11, and a protective layer 14 provided on the reversible thermosensitive recording layer 13.

Figure 8B:
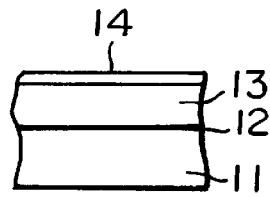
FIG. 8b is a schematic cross-sectional view of another example of a reversible thermosensitive recording medium film of the present invention.

FIG. 8b is a schematic cross-sectional view of another example of a reversible thermosensitive recording medium film of the present invention, which comprises a support 11, an aluminum reflection layer 12 provided on the support 11, a reversible thermosensitive recording layer 13 provided on the aluminum reflection layer 12, and a protective layer 14 provided on the reversible thermosensitive recording layer 13.

Figure 8C:
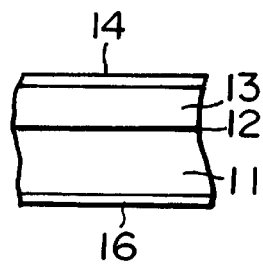
FIG. 8c is a schematic cross-sectional view of a further example of a reversible thermosensitive recording medium film of the present invention.

FIG. 8c is a schematic cross-sectional view of another example of a reversible thermosensitive recording medium film of the present invention, which comprises a support 11, an aluminum reflection layer 12 provided on the support 11, a reversible thermosensitive recording layer 13 provided on the aluminum reflection layer 12, a protective layer 14 provided on the reversible thermosensitive recording layer 13, and a magnetic recording layer 16 provided on the back side of the support 11 opposite to the aluminum reflection layer 12.

The reversible thermosensitive recording medium film as shown in FIG. 8c can be worked into a card 21 with the provision of a rewritable portion 22 comprising the reversible thermosensitive recording layer of the reversible thermosensitive recording medium film as shown in FIG. 8c, and a printed display portion 23 on a front side thereof, and with the provision of a magnetic recording portion 24 comprising the magnetic recording layer 16 of the reversible thermosensitive recording medium film on a back side thereof as shown in FIG. 9.

Furthermore, as shown in FIG. 10a, the reversible thermosensitive recording medium film of the present invention, which comprises the support 11, the aluminum reflection layer 12 provided on the support 11, the reversible thermosensitive recording layer 13 provided on the aluminum reflection layer 12, and the protective layer 14 provided on the reversible thermosensitive recording layer 13 as shown in FIG. 8b can be worked into a card, with the provision of a concave portion 23 for holding an IC chip therein. In this example, rewritable recording portions 24 are attached using a label, and the concave portion 23 for holding an IC chip is formed on the back side of the card. More specifically, a wafer 231 as shown in FIG. 10b is placed in the concave portion 23 and fixed thereto. In the wafer 231, an integrated circuit 233 is mounted on a wafer substrate 232, and a plurality of contact terminals 234 which are electrically connected to the integrated circuit 233 is also mounted on the wafer substrate 232.

The contact terminals 234 are exposed on the back side of the wafer substrate 232 and electrically come into contact with a printer (Trademark "readerwriter") in such a structure that is capable of reading a predetermined information and rewriting the same.

The function of such a card will now be explained with reference to FIG. 11a and FIG. 11b.

Figure 11A:
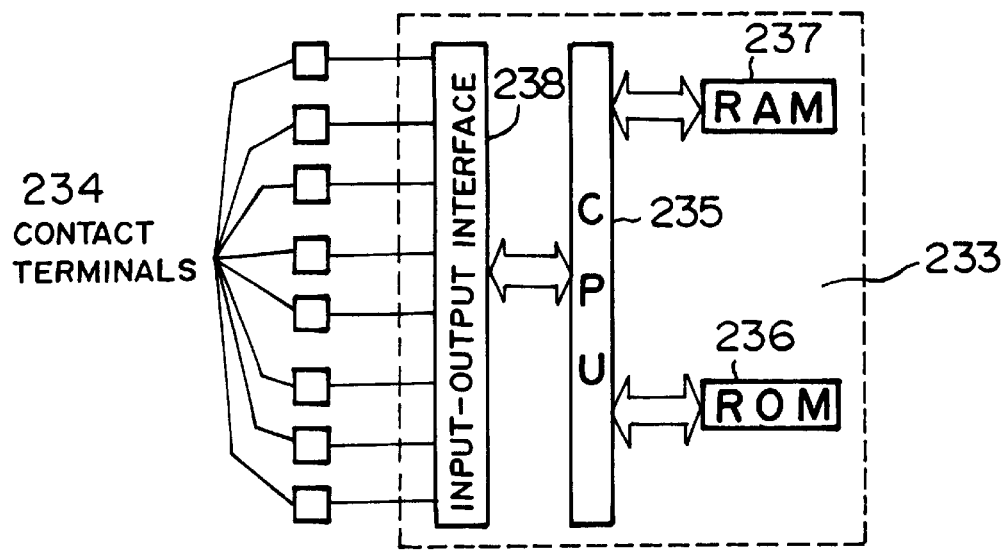
FIG. 11a is a block diagram showing the structure of an integrated circuit for use in the IC chip shown in FIG. 10b.

FIG. 11a is a block diagram showing the structure of the integrated circuit 233. FIG. 11b is a block diagram of an example of a RAM memory data. The integrated circuit 233 is composed of, for example, an LSI, which includes CPU 235 which is capable of performing a control operation in a predetermined procedure, ROM 236 for storing an operation program data, and RAM 237 which is capable of writing and reading necessary data. The integrated circuit 233 includes (a) an input-output interface 238 which, upon receiving an input signal, outputs an input data to CPU 235 and at the same time, upon receiving an output signal from CPU 235, outputs an output signal to the outside, (b) a power-ON-reset circuit, (c) a clock generation circuit, (d) a pulse dividing circuit (i.e. interrupt pulse generation circuit) and (e) an address decoder circuit, which are not shown. CPU 235 is capable of performing an interrupt control routine operation in response to an interrupt pulse which is periodically provided by the pulse dividing circuit. The address decoder circuit decodes address data output from CPU 235 and outputs a signal to ROM 236, RAM 237 and the input-output interface 238, respectively. To the input-output interface 238 is connected a plurality of contact terminals 234, so that a predetermined data from the above-mentioned printer (Trademark "reader-writer") is input to CPU 235 from the contact terminals 234 via the input-output interface 238. CPU 235 performs an operation in response to the input signal, and an operation in accordance with a program data stored in ROM 236, and outputs a predetermined data and signals to the card readerwriter via the input-output interface 238.

Figure 11B:
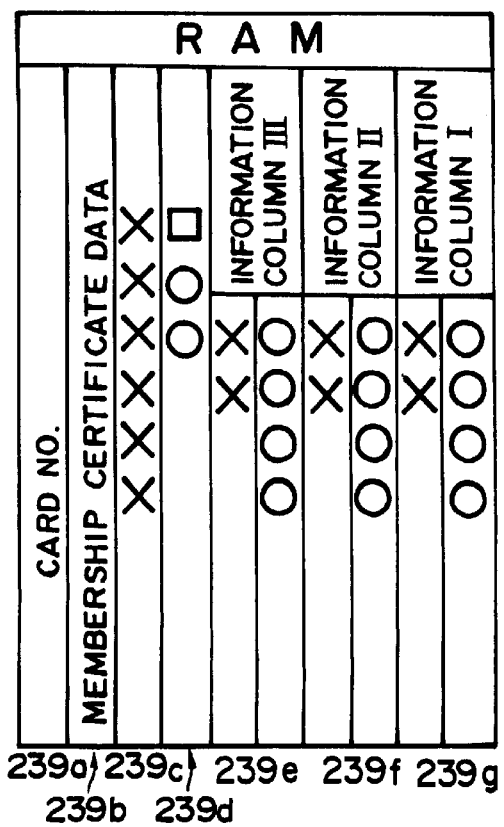
FIG. 11b is a block diagram of an example of a RAM memory data.

As shown in FIG. 11b, RAM 237 includes a plurality of memory areas 239a to 239g. For instance, memory area 239a stores Card No., memory area 239b stores ID data of the owner of the card, such as the name, address and telephone number of the owner, memory area 239c stores, for instance, data or information concerning the remaining value that can be used by the owner, and memory areas 239d to 239g store information concerning the amount of money used in the past.

A method of recording images and erasing recorded images using the reversible thermosensitive recording medium of the present invention and an apparatus therefor will now be explained in detail.

For recording images, image recording means which is capable of applying heat imagewise to the recording medium, such as a thermal head and laser, can be employed.

For erasing recorded images, image erasing means such as hot stamp, ceramic heater, heat roller, hot air, thermal head and laser can be employed. Of these image erasing means, ceramic heater is preferable for use in the present invention.

By use of a ceramic heater, an apparatus for erasing recorded images can be made compact in size, and a stable erased state and images with excellent contrast can be obtained. It is preferable that the ceramic heater be set at 110° C. or more, more preferably at 112° C. or more, furthermore preferably at 115° C. or more.

By use of a thermal head, the apparatus for recording images and erasing recorded images can be made more compact in size and the power consumption thereof can be reduced, and a battery-driven, handy type apparatus for recording images and erasing recorded images can also be made. When a thermal head which can be used for both recording images and erasing the same is used, the apparatus can be made furthermore compact in size. When images are recorded and erased by use of a single thermal head, new images may be recorded after the previously formed images are erased entirely, or new images may be successively formed in an overwrite manner as the previously formed images are successively erased with the amount of energy applied thereto for erasing being changed. This overwrite method can minimize the total time required for the recording and the erasing, so that the recording speed can be increased.

When a card which includes the reversible thermosensitive recording layer and the above-mentioned information memory portion is used, the above apparatus include means for reading information stored in the information memory portion and rewriting information to be stored in the information memory portion.

Figure 12A:
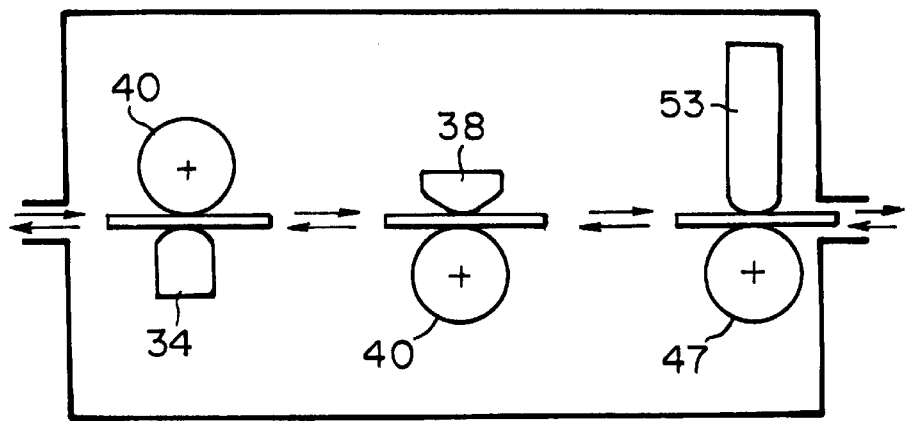
FIG. 12a is a schematic diagram of an example of an apparatus of the present invention for recording images on the reversible thermosensitive recording medium of the present invention and erasing recorded images therefrom.

FIG. 12a is a schematic diagram of an example of an apparatus for use in the present invention for recording images on the reversible thermosensitive recording medium of the present invention and erasing recorded images therefrom. In this apparatus, images are erased using a ceramic heater, while images are formed using a thermal head.

In the apparatus shown in FIG. 12a, a reversible thermosensitive recording medium 10 comprising a support, a reversible thermosensitive recording layer provided on the support and a magnetic recording layer provided on the back side of the support opposite to the reversible thermosensitive layer can be transported along a transport path in either of a forward direction or a backward direction as indicated by double arrows.

The reversible thermosensitive recording medium 10 is transported between a transport roller 40a and a magnetic head 34, so that information is recorded in or erased from the magnetic recording layer by the magnetic head 34.

The reversible thermosensitive recording medium 10 is subjected to heat treatment for image erasure by a ceramic heater 38 while the recording medium 10 is transported between the ceramic heater 38 and a transport roller 40b, and images are formed in the recording medium 10 by a thermal head 53 while the recording medium 10 is transported between the thermal head 53 and a transport roller 40c, and then the recording medium 10 is discharged from the apparatus.

In the apparatus shown in FIG. 11a, the information recorded in the magnetic recoding layer of the reversible thermosensitive recording medium 10 is read by the magnetic head 34, and images recorded in the reversible thermosensitive recording layer are then erased with the application of heat thereto by the ceramic heater 38, and newly processed data is then recorded in the reversible thermosensitive recording layer by the thermal head 53, based on the information read by the magnetic head 34. Thereafter the information recorded in the magnetic recording layer is rewritten and replaced with a new information.

It is preferable that the ceramic heater 38 be set at 110° C. or more, more preferably at 112° C. or more, furthermore preferably at 115° C. or more. The information recorded in the magnetic recording layer may be rewritten either before or after the erasure of images by the ceramic heater 38.

If desired, the reversible thermosensitive recording medium 10 can be transported in the backward direction along the transport path after the transport thereof between the ceramic heater 38 and the transport roller 40b, or after the transport thereof between the thermal head 53 and the transport roller 40c, and again subjected to the heat treatment by the ceramic heater 38 or a printing treatment by the thermal head 53.

Figure 12B:
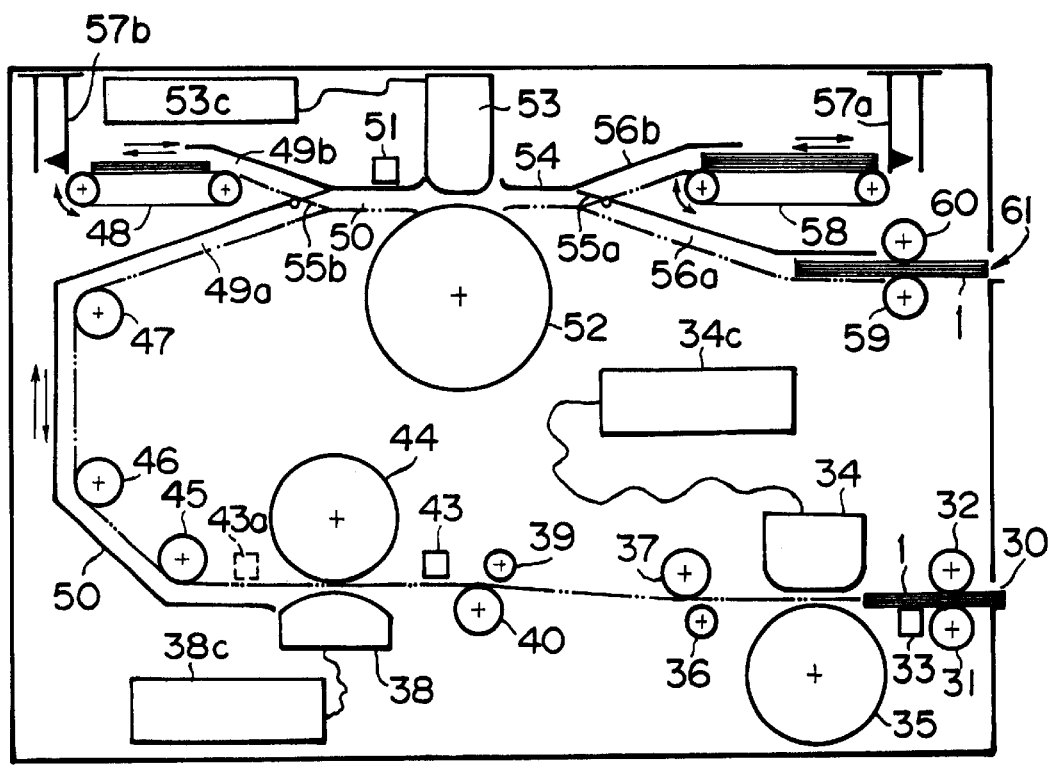
FIG. 12b is a schematic diagram of another example of an apparatus of the present invention for recording images on the reversible thermosensitive recording medium of the present invention and erasing recorded images therefrom.
Figure 13:
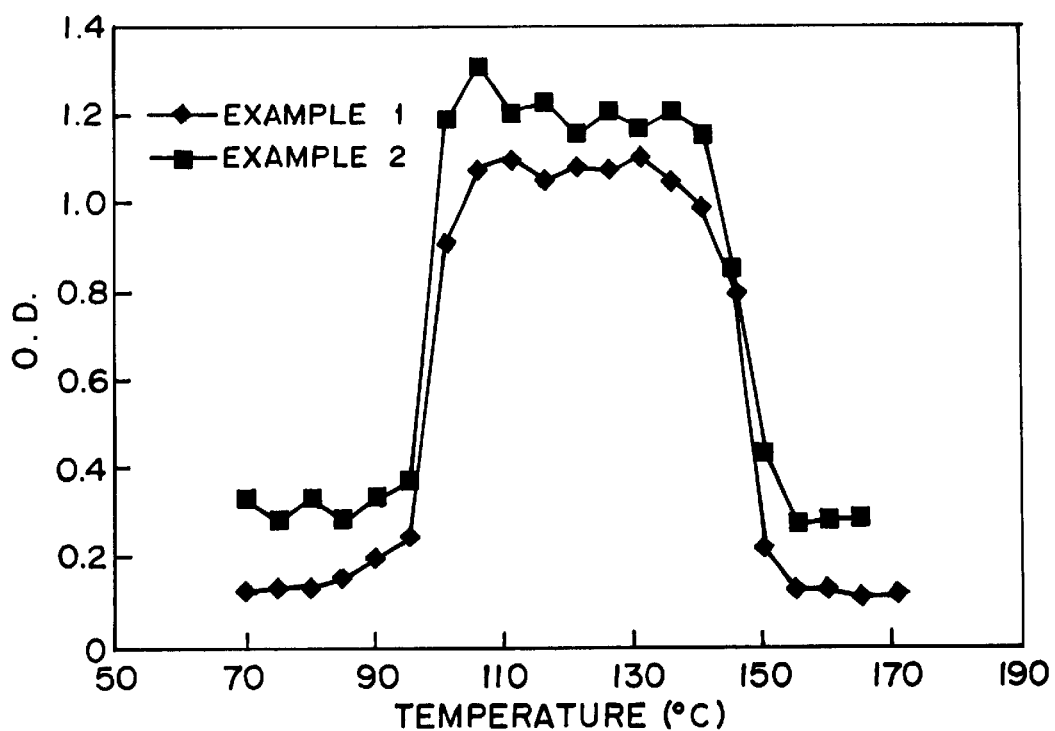
FIGS. 13 to 18 are graphs showing the relationship between the temperature of the heat applied to each of reversible thermosensitive recording media Nos. 1 to No. 8 of the present invention and comparative reversible thermosensitive recording media Nos. 1 to 6 and the optical image density obtained by each of the media.
Figure 14:
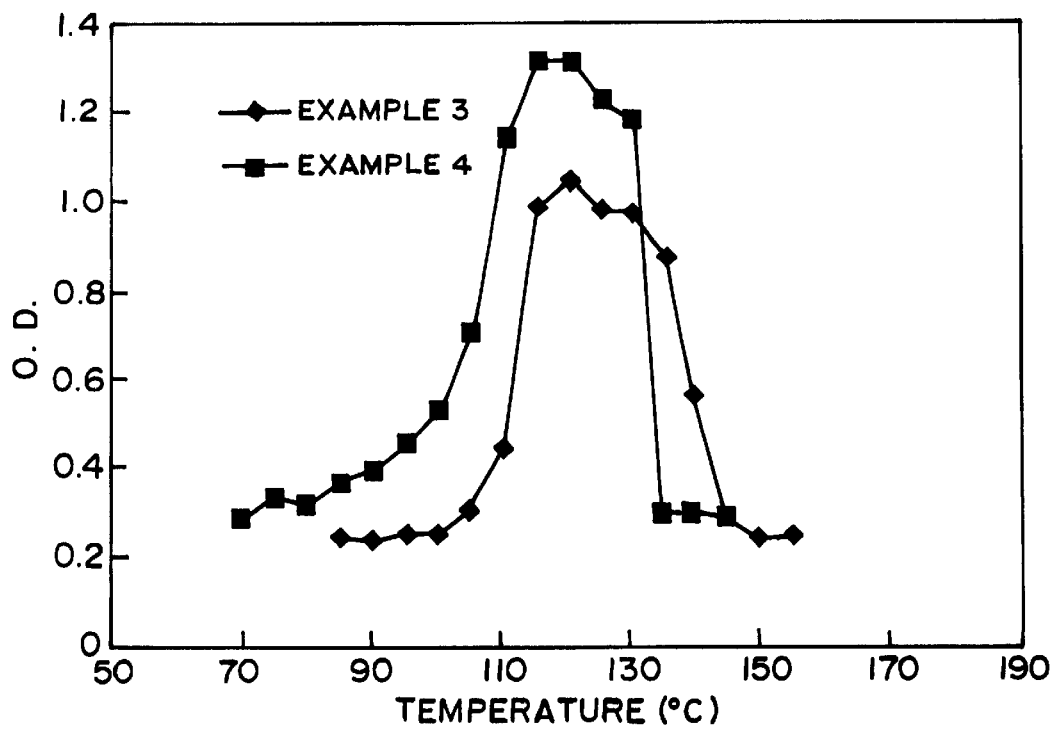
Figure 15:
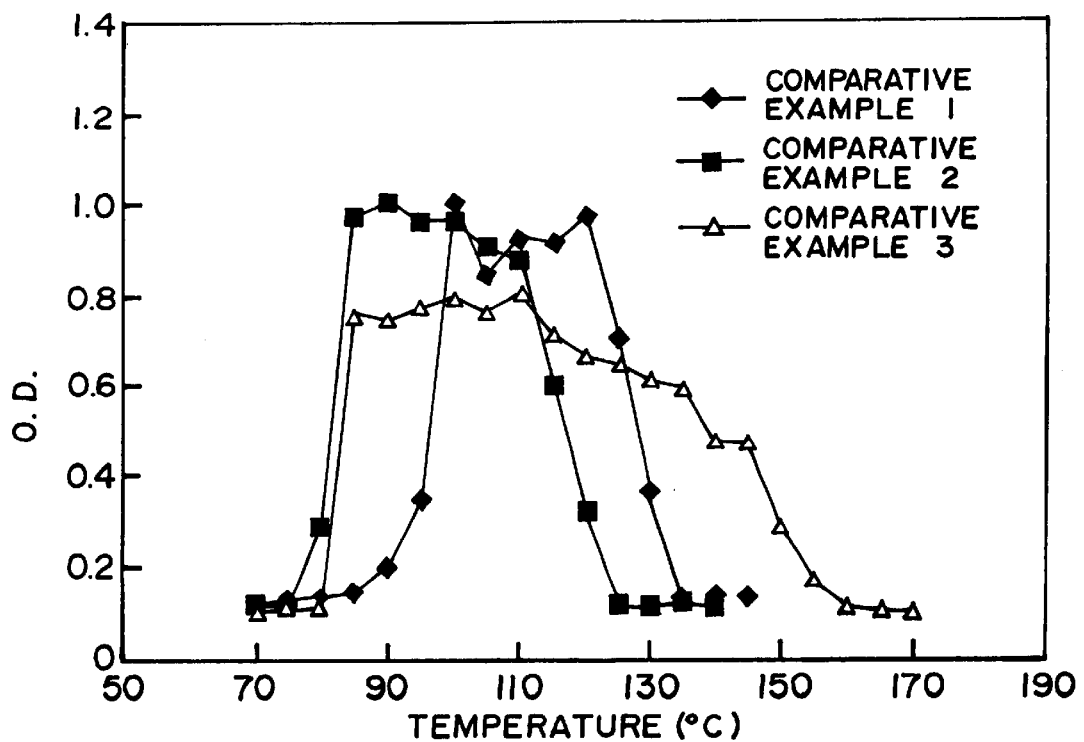
Figure 16:
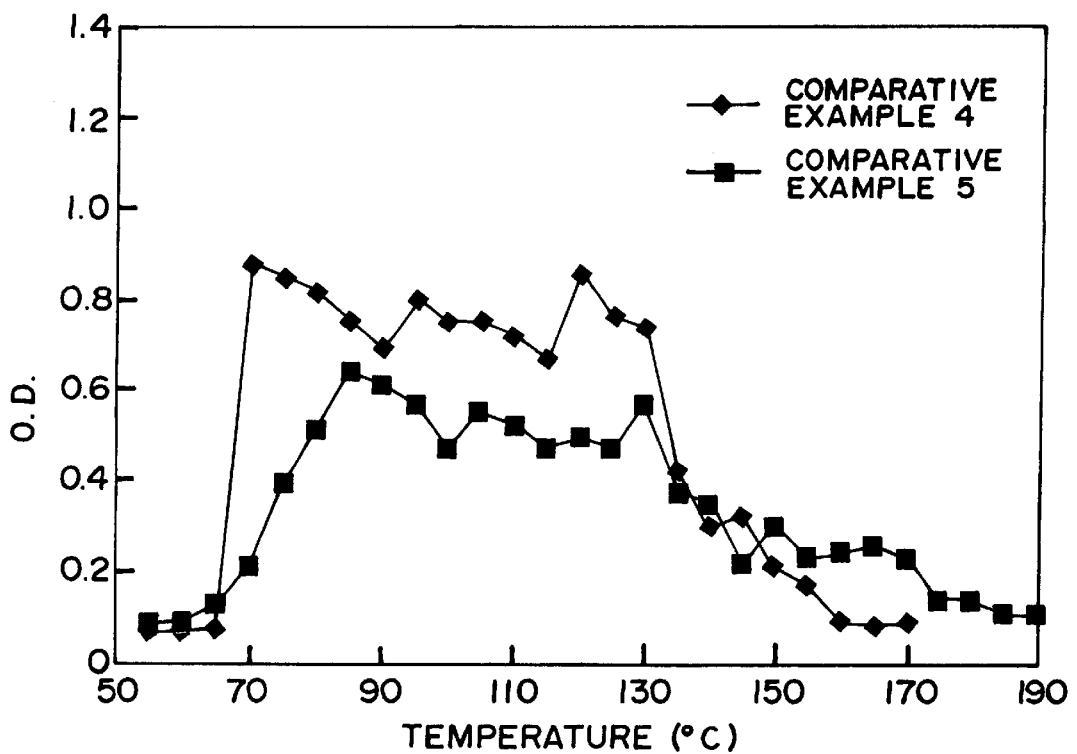
Figure 17:
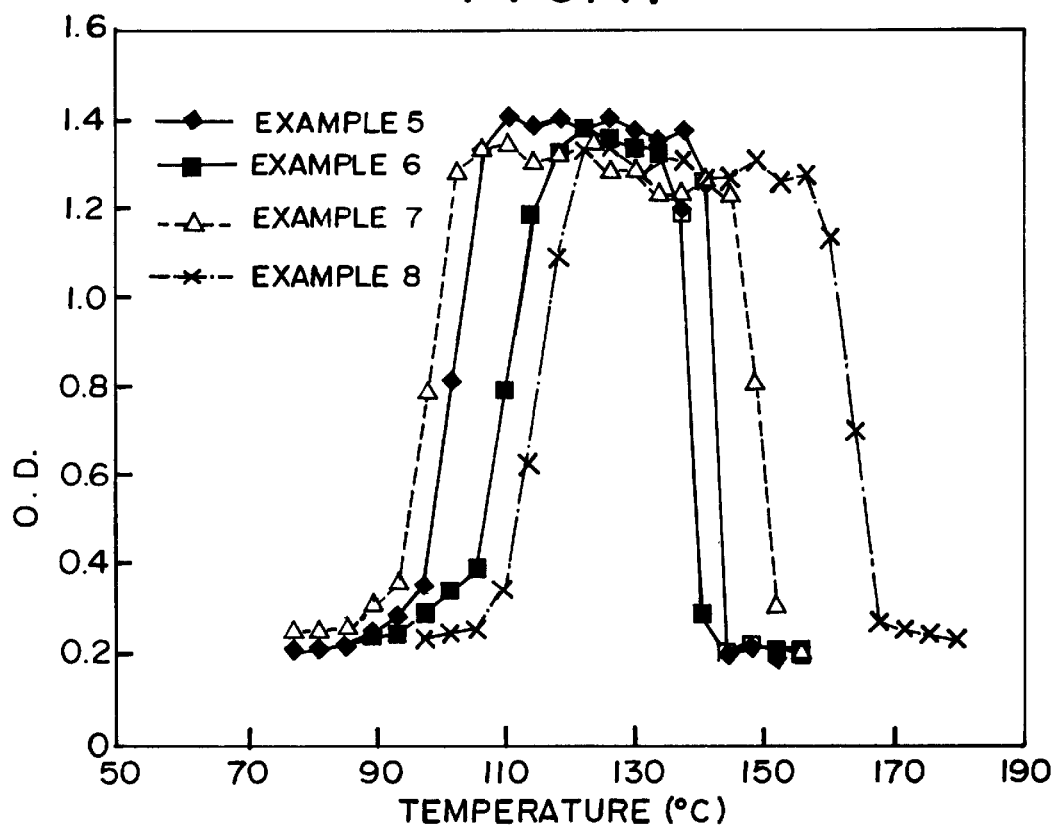
Figure 18:
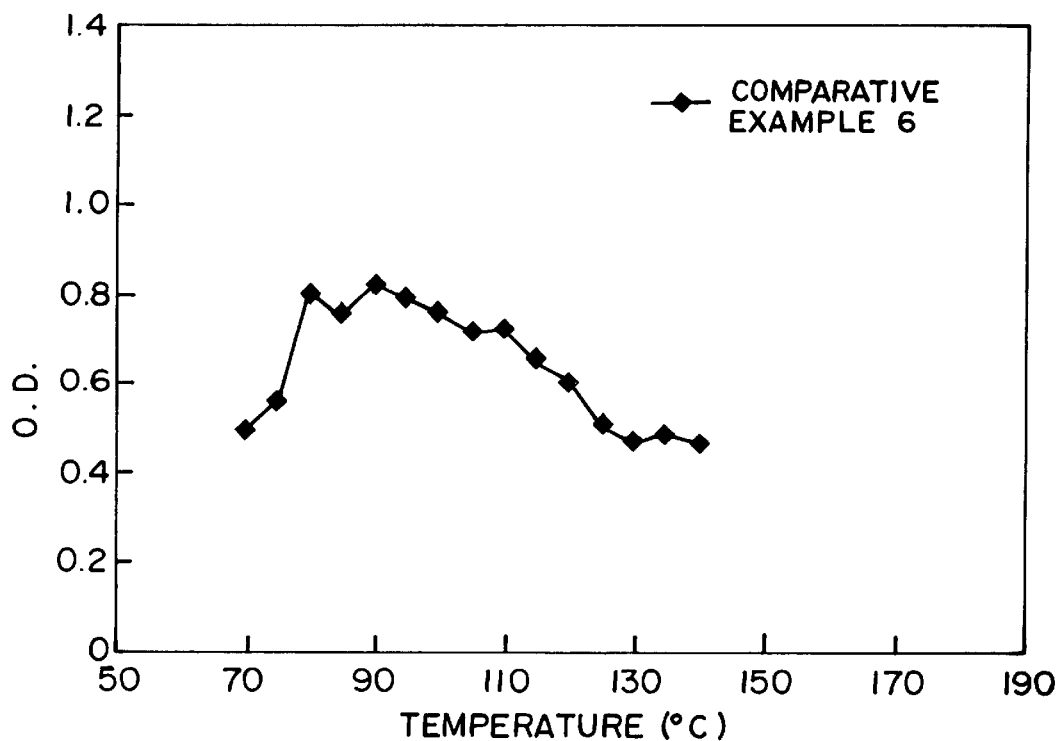

FIG. 12b is a schematic diagram of another example of an apparatus of the present invention for recording images on the reversible thermosensitive recording medium of the present invention and erasing recorded images therefrom.

In this apparatus, the reversible thermosensitive recording medium 10 is transported in either a forward direction or a backward direction along a transport path shown by an alternate long and two short dashes line. The reversible thermosensitive recording medium 10 is inserted into an inlet 30 and then transported into the apparatus by a transport roller 31 and a guide roller 32. When the recording medium 10 reaches a predetermined position on the transport path 50, the presence of the recording medium 10 is detected by a sensor 33 through a control means 34c, and magnetic recording or erasure is conducted in the magnetic recording layer of the recording medium 10 by a magnetic head 34 between the magnetic head 34 and a platen roller 35. The recording medium 10 is then transported between a guide roller 36 and a transport roller 37 and then between a guide roller 39 and a transport roller 40. When the presence of the recording medium 10 is detected by a sensor 43 through a ceramic heater control means 38C, a ceramic heater 38 is actuated and the recording medium 10 is subjected to heat treatment for image erasure between the actuated ceramic heater 38 and a platen roller 44. The recording medium 10 is then transported along the transport path 50 by transport rollers 45, 46 and 47. When the presence of the recording medium 10 is detected at a predetermined position by a sensor 51 through a thermal head control means 53C, a thermal head 53 is actuated and images are formed in the recording medium 10 between the actuated thermal head 53 and a platen roller 52. The recording medium 10 is then transported along a transport path 56a by a transport roller 59 and a guide roller 60 and discharged from an outlet 61 to the outside of the apparatus.

As mentioned above, it is preferable that the ceramic heater 38 be set at 110° C. or more, more preferably at 112° C. or more, furthermore preferably at 115° C. or more.

If desired, the recording medium 10 can be guided to a transport path 56b, using a transport switching means 55a, and then transported in a backward direction so as to be again subjected to the heat treatment between the thermal head 53 and the platen roller 52 by a transport belt 58 which is driven in a reverse direction through a limit switch 57a, which is turned on as depressed by the recording medium 10.

The recording medium 10 is then transported in a normal direction towards the transport path 56a, through a transport path 49b which is opened by the transport switching means 55a, a limit switch 57b and a transport belt 43, and then transported along the transport path 56a by the transport roller 59 and the guide roller 60 so as to be discharged outside from the outlet 61. The thus branched transport path and the transport path switching means can be provided on both sides of the ceramic heater 38. In this case, it is preferable that a sensor 43a be provided between the platen roller 44 and the transport roller 45.

Other features of this invention will become apparent in the course of the following description of exemplary embodiments, which are given for illustration of the invention and are not intended to be limiting thereof.

EXAMPLE 1

[Preparation of Reversible Thermosensitive Recording Medium No. 1]

[Formation of Thermosensitive Recording Layer]

The following components with the following formulation were mixed to prepare a solution:

|  | Parts by Weight |
| --- | --- |
| $HOOC(CH_2)_5NHCO(CH_2)_{10}CONH(CH_2)_5COOH$ | 1.2 |
| Eicosanedioic acid (Trademark: "SL-20-90", made by Okamura Oil Mill, Ltd.) | 1.8 |

-continued

|  | Parts by Weight |
| --- | --- |
| Vinyl chloride-vinyl acetate copolymer (Trademark: "VYHH", made by Union Carbide Japan K.K.) | 38 |
| Dimethylformamide | 230 |

To the above solution, 7 parts by weight of melissic acid (Reagent, made by Sigma Chemical Co.) were added.

Ceramic beads with a diameter of about 2 mm were also added to the above mixture and dispersed for about 18 hours using a commercially available paint shaker (made by Asada Tekko Co., Ltd.), whereby a coating liquid containing resin particles with a particle size of about 10 $\mu$m was prepared.

The thus prepared coating liquid was coated on a transparent polyester film (Trademark: "Lumirror-T-60", made by Toray Industries, Inc.) with a thickness of about 50 $\mu$m serving as a support, and dried under application of heat thereto, whereby a thermosensitive recording layer with a thickness of about 12 $\mu$m was formed on the support.

[Formation of Overcoat Layer]

The following components were mixed to prepare a coating liquid for the formation of an overcoat layer:

|  | Parts by Weight |
| --- | --- |
| 75% butyl acetate solution of urethane acrylate-based ultraviolet-curing resin (Trademark: "Unidic C7-157", made by Dainippon Ink & Chemicals, Incorporated.) | 10 |
| Isopropyl alcohol | 10 |

The thus prepared coating liquid was coated on the thermosensitive recording layer by a wire bar, dried under application of heat thereto, and cured by being exposed to the ultraviolet light of a high-pressure mercury lamp of 80 W/cm, whereby an overcoat layer with a thickness of about 3 $\mu$m was overlaid on the thermosensitive recording layer. Thus, a reversible thermosensitive recording medium No. 1 of the present invention was prepared.

EXAMPLE 2

[Preparation of Reversible Thermosensitive Recording Medium No. 2]

[Formation of Light Reflection Layer]

Aluminum was deposited in vacuum with a thickness of about 400 Å on a polyethylene terephthalate (PET) side of a commercially available magnetic sheet (Trademark "Memorydic DS-1711-1040", made by Dainippon Ink & Chemicals, Incorporated) composed of a 188 $\mu$m thick transparent PET film, a magnetic recording layer provided thereon, and a self-cleaning layer formed on the magnetic recording layer, whereby a light reflection layer with a thickness of about 400 Å was formed.

[Formation of Adhesive Layer]

The following components were mixed to prepare a coating liquid for the formation of an adhesive layer:

| | Parts by Weight |
|---|---|
| Vinyl chloride-vinyl acetate-phosphate copolymer (Trademark: "Denka Vinyl #1000P", made by Denki Kagaku Kogyo K.K.) | 10 |
| Methyl ethyl ketone | 45 |
| Toluene | 45 |

The thus prepared coating liquid was coated on the above prepared light reflection layer and dried under application of heat thereto, whereby an adhesive layer with a thickness of about 0.5 μm was formed on the light reflection layer.

[Formation of Reversible Thermosensitive Recording Layer and Overcoat Layer]

The same reversible thermosensitive recording layer as prepared in Example 1 was provided on the above adhesive layer, and then the same overcoat layer as prepared in Example 1 was also provided on the reversible thermosensitive recording layer in the same manner as in Example 1, whereby a reversible thermosensitive recording medium No. 2 of the present invention was prepared.

EXAMPLE 3

[Preparation of Reversible Thermosensitive Recording Medium No. 3]

[Formation of Thermosensitive Recording Layer]

The following components with the following formulation were mixed to prepare a solution:

| | Parts by Weight |
|---|---|
| Vinyl chloride-vinyl acetate copolymer (Trademark: "VYHH", made by Union Carbide Japan K.K.) | 6 |
| Tetrahydrofuran | 33 |
| Ethyl cellosolve | 8 |

To the above solution, 3 parts by weight of $CH_3(CH_2)_{17}NHCONH(CH_2)_2COOH$ were added.

Ceramic beads with a diameter of about 2 mm were also added to the above mixture and dispersed for about 18 hours using a commercially available paint shaker (made by Asada Tekko Co., Ltd.), whereby a dispersion (A) of resin particles with a particle size of about 10 μm was prepared.

The following components with the following formulation were mixed to prepare a solution:

| | Parts by Weight |
|---|---|
| Adipic acid monostearylamide (prepared by Miyoshi Oil & Fat Co., Ltd.) | 5.5 |
| Vinyl chloride-vinyl acetate copolymer (Trademark: "VYHH", made by Union Carbide Japan K.K.) | 32 |
| Tetrahydrofuran | 120 |
| Ethyl cellosolve | 32 |

175 parts by weight of this solution were added to 218 parts by weight of the above dispersion (A) to prepare a coating liquid.

The procedure for preparation of the reversible thermosensitive recording material No. 1 in Example 1 was repeated except that the coating liquid for the formation of the thermosensitive recording layer used in Example 1 was replaced by the above prepared coating liquid, whereby a reversible thermosensitive recording medium No. 3 of the present invention was prepared:

EXAMPLE 4

[Preparation of Reversible Thermosensitive Recording Medium No. 4]

The procedure for preparation of the reversible thermosensitive recording material No. 1 in Example 1 was repeated except that the coating liquid for the formation of the thermosensitive recording layer used in Example 1 was replaced by a coating liquid with the following formulation, whereby a reversible thermosensitive recording medium No. 4 of the present invention was prepared:

| | Parts by Weight |
|---|---|
| Adipic acid monostearylamide (prepared by Miyoshi Oil & Fat Co., Ltd.) | 5 |
| Stearylsulfonyl propionic acid (prepared by Miyoshi Oil & Fat Co., Ltd.) | 5 |
| Vinyl chloride-vinyl acetate copolymer (Trademark: "VYHH", made by Union Carbide Japan K.K.) | 38 |
| Tetrahydrofuran | 210 |
| Toluene | 20 |

Comparative Example 1

[Preparation of Comparative Reversible Thermosensitive Recording Medium No. 1]

The procedure for preparation of the reversible thermosensitive recording material No. 1 in Example 1 was repeated except that the coating liquid for the formation of the thermosensitive recording layer used in Example 1 was replaced by a coating liquid with the following formulation, whereby a comparative reversible thermosensitive recording medium No. 1 was prepared:

| | Parts by Weight |
|---|---|
| Behenic acid (Reagent with a purity of 99%, made by Sigma Chemical Co.) | 5 |
| Eicosanedioic acid (Trademark: "SL-20-90", made by Okamura Oil Mill, Ltd.) | 5 |
| Vinyl chloride-vinyl acetate copolymer (Trademark: "VYHH", made by Union Carbide Japan K.K.) | 38 |
| Tetrahydrofuran | 210 |
| Toluene | 20 |

Comparative Example 2

[Preparation of Comparative Reversible Thermosensitive Recording Medium No. 2]

[Formation of Thermosensitive Recording Layer]

The following components with the following formulation were mixed to prepare a coating liquid for the formation of a thermosensitive recording layer:

| | Parts by Weight |
|---|---|
| Behenic acid (Reagent with a purity of 99%, made by Sigma Chemical Co.) | 6 |
| Eicosanedioic acid (Trademark: "SL-20-90", made by Okamura Oil Mill, Ltd.) | 1 |
| 1,4-cis-cyclohexanedicarbonic acid (Reagent, made by Tokyo Kasei Kogyo Co., Ltd.) | 0.7 |
| 1,4-trans-cyclohexanedicarbonic acid (Reagent, made by Tokyo Kasei Kogyo Co., Ltd.) | 0.7 |
| Vinyl chloride-vinyl acetate-vinyl alcohol copolymer (Trademark: "S-Lec A", made by Sekisui Chemical Co., Ltd.) | 24 |
| Isocyanate (Curing agent, Trademark: "Duranate 24A-100", made by Asahi Chemical Industry Co., Ltd.) | 2.4 |
| Triethylenediamine (Curing promoter; Reagent, made by Tokyo Kasei Kogyo Co., Ltd) | 0.24 |
| Tetrahydrofuran | 136 |
| Toluene | 14 |

The thus prepared coating liquid was coated on an about 50 μm thick transparent polyester film (Trademark: "Lumirror T-60" made by Toray Industries, Inc.), and heated to 130° C. for 3 minutes, dried and cured, whereby a reversible thermosensitive recording layer with a thickness of about 12 μm was formed on the transparent polyester film.

[Formation of Overcoat Layer]

The same overcoat layer as prepared in Example 1 was provided on the reversible thermosensitive recording layer in the same manner as in Example 1, whereby a comparative reversible thermosensitive recording medium No. 2 was prepared.

Comparative Example 3

[Preparation of Comparative Reversible Thermosensitive Recording Medium No. 3]

The procedure for preparation of the comparative reversible thermosensitive recording material No. 2 in Comparative Example 2 was repeated except that the coating liquid for the formation of the thermosensitive recording layer used in Comparative Example 2 was replaced by a coating liquid with the following formulation, whereby a comparative reversible thermosensitive recording medium No. 3 was prepared:

| | Parts by Weight |
|---|---|
| Behenic acid (Reagent with purity of 99%, made by Sigma Chemical Co.) | 9 |
| 1,4-cis-cyclohexanedicarbonic acid (Reagent, made by Tokyo Kasei Kogyo Co., Ltd.) | 0.5 |
| 1,4-trans-cyclohexanedicarbonic acid (Reagent, made by Tokyo Kasei Kogyo Co., Ltd.) | 0.5 |
| Vinyl chloride-vinyl acetate-vinyl alcohol copolymer (Trademark: "S-Lec A", made by Sekisui Chemical Co., Ltd.) | 30 |
| Isocyanate (Curing agent, Trademark: "Duranate 24A-100", made by Asahi Chemical Industry Co., Ltd.) | 3 |
| Triethylenediamine (Curing promoter; Reagent, made by Tokyo Kasei Kogyo Co., Ltd) | 0.3 |
| Tetrahydrofuran | 170 |
| Toluene | 17 |

Comparative Example 4

[Preparation of Comparative Reversible Thermosensitive Recording Medium No. 4]

The procedure for preparation of the reversible thermosensitive recording material No. 1 in Example 1 was repeated except that the coating liquid for the formation of the thermosensitive recording layer used in Example 1 was replaced by a coating liquid with the following formulation, whereby a comparative reversible thermosensitive recording medium No. 4 was prepared:

| | Parts by Weight |
|---|---|
| 12-tricosanone (Reagent, made by Tokyo Kasei Kogyo Co., Ltd.) | 33 |
| 14-heptacosanone (Reagent, made by Tokyo Kasei Kogyo Co., Ltd.) | 11 |
| Deoxycholic acid (Reagent, made by Tokyo Kasei Kogyo Co., Ltd.) | 4 |
| Vinyl chloride-vinyl acetate copolymer (Trademark: "VYHH", made by Union Carbide Japan K.K.) | 100 |
| Tetrahydrofuran | 550 |
| Toluene | 55 |

Comparative Example 5

[Preparation of Comparative Reversible Thermosensitive Recording Medium No. 5]

The procedure for preparation of the reversible thermosensitive recording material No. 1 in Example 1 was repeated except that the coating liquid for the formation of the thermosensitive recording layer used in Example 1 was replaced by a coating liquid with the following formulation, whereby a comparative reversible thermosensitive recording medium No. 5 was prepared:

| | Parts by Weight |
|---|---|
| Ethyl lignocerate (Reagent, made by Tokyo Kasei Kogyo Co., Ltd.) | 30 |
| Deoxycholic acid (Reagent, made by Tokyo Kasei Kogyo Co., Ltd.) | 10 |
| Vinyl chloride-vinyl acetate copolymer (Trademark: "VYHH", made by Union Carbide Japan K.K.) | 100 |
| Tetrahydrofuran | 570 |
| Toluene | 57 |

EXAMPLE 5

[Preparation of Reversible Thermosensitive Recording Medium No. 5]

[Formation of Thermosensitive Recording Layer]

The following components with the following formulation were mixed to prepare a solution:

|  | Parts by Weight |
| --- | --- |
| Vinyl chloride based polymer (Trademark "MR-110" made by Nippon Zeon Co., Ltd.) | 24 |
| Tetrahydrofuran | 125 |
| o-xylene | 27 |

To the above solution, 7 parts by weight of melissic acid (Reagent, made by Sigma Chemical Co.), 1.5 parts by weight of eicosanedioic acid (Trademark: "SL-20-90", made by Okamura Oil Mill, Ltd.) and 1.5 parts by weight of $HOOC(CH_2)_5NHCO(CH_2)_4CONH(CH_2)_5COOH$ were added.

Ceramic beads with a diameter of about 2 mm were also added to the above mixture and dispersed for about 48 hours using a commercially available paint shaker (made by Asada Tekko Co., Ltd.), whereby a dispersion of resin particles with a particle size of about 2 μm was prepared.

2.5 parts by weight of a commercially available isocyanate compound (Trademark: "Coronate HK", made by Nippon Polyurethane Industry Co., Ltd.) were added to the mixture, whereby a coating liquid for the formation of a thermosensitive recording layer was prepared.

[Formation of Light Reflection Layer]

Aluminum was deposited in vacuum with a thickness of about 400 Å on a polyethylene terephthalate (PET) side of a commercially available magnetic sheet (Trademark "Memorydic DS-1711-1040", made by Dainippon Ink & Chemicals, Incorporated) composed of a 188 μm thick transparent PET film, a magnetic recording layer provided thereon, and a self-cleaning layer formed on the magnetic recording layer, whereby a light reflection layer with a thickness of about 400 Å was formed.

[Formation of Adhesive Layer]

The following components were mixed to prepare a coating liquid for the formation of an adhesive layer:

|  | Parts by Weight |
| --- | --- |
| Vinyl chloride-vinyl acetate-phosphate copolymer (Trademark: "Denka Vinyl #1000P", made by Denki Kagaku Kogyo K.K.) | 10 |
| Methyl ethyl ketone | 45 |
| Toluene | 45 |

The thus prepared coating liquid was coated on the above prepared light reflection layer and dried under application of heat thereto, whereby an adhesive layer with a thickness of about 0.5 μm was formed on the light reflection layer.

[Formation of Reversible Thermosensitive Recording Layer and Overcoat Layer]

The above prepared coating liquid for the formation of a thermosensitive recording layer was coated on the adhesive layer and dried at about 130° C. for 3 minutes, whereby a thermosensitive recording layer with a thickness of about 10 μm was formed.

The above composite material including the thermosensitive recording layer formed on the adhesive layer was then allowed to stand at about 60 ° C. for 24 hours, whereby the isocyanate and the vinyl chloride based copolymer were subjected to cross linking.

The same overcoat layer as prepared in Example 1 was also provided on the reversible thermosensitive recording layer in the same manner as in Example 1, and was then heated to about 150° C. for 30 seconds to fuse the organic low-molecular weight material, and the reversible thermosensitive recording layer was then made transparent at 100° C., whereby a reversible thermosensitive recording medium No. 5 of the present invention was prepared.

EXAMPLE 6

[Preparation of Reversible Thermosensitive Recording Medium No. 6]

The procedure for preparation of the reversible thermosensitive recording material No. 5 in Example 5 was repeated except that the mellissic acid employed in the coating liquid for the formation of the thermosensitive recording layer used in Example 5 was replaced by adipic acid monostearylamide, whereby a reversible thermosensitive recording medium No. 6 of the present invention was prepared.

EXAMPLE 7

[Preparation of Reversible Thermosensitive Recording Medium No. 7]

The procedure for preparation of the reversible thermosensitive recording material No. 5 in Example 5 was repeated except that $HOOC(CH_2)_5NHCO(CH_2)_4CONH(CH_2)_5COOH$ employed in the coating liquid for the formation of the thermosensitive recording layer used in Example 5 was replaced by $HOOC(CH_2)_3NHCO(CH_2)_{12}CONH (CH_2)_3COOH$, and that after the provision of the overcoat layer, the reversible thermosensitive recording medium was heated to 160° C., whereby a reversible thermosensitive recording medium No. 7 of the present invention was prepared.

EXAMPLE 8

[Preparation of Reversible Thermosensitive Recording Medium No. 8]

The procedure for preparation of the reversible thermosensitive recording material No. 5 in Example 5 was repeated except that $HOOC(CH_2)_5NHCO(CH_2)_4CONH(CH_2)_5COOH$ employed in the coating liquid for the formation of the thermosensitive recording layer used in Example 5 was replaced by $HOOC(CH_2)_5NHCO(CH_2)_2CONH (CH_2)_5COOH$, that the mellissic acid employed in the coating liquid for the formation of the thermosensitive recording layer used in Example 5 was replaced by stearamide (reagent, made by Tokyo Kasei Kogyo Co., Ltd.), and that after the provision of the overcoat layer, the reversible thermosensitive recording medium was heated to 175° C., whereby a reversible thermosensitive recording medium No. 8 of the present invention was prepared.

EXAMPLE 9

An acrylic tacky layer with a thickness of about 5 μm was formed on the back side of the support of the reversible thermosensitive recording medium No. 1 prepared in Example 1 opposite to the reversible thermosensitive recording layer thereof, whereby a reversible thermosensitive recording label was prepared.

The thus prepared reversible thermosensitive recording label was cut into a doughnut-shaped reversible thermosensitive recording label 2 as illustrated in FIG. 5. The thus prepared reversible thermosensitive recording label 2 was applied to a CD-RW 3 as illustrated in FIG. 5, whereby an optical information recording medium having a reversible thermosensitive recording display function was prepared.

Part of information such as date and time, stored in the CD-RW 3 by a commercially available CD-RW drive (Trademark: "MP6200S", made by Ricoh Company, Ltd.), was recorded in the reversible thermosensitive recording layer of the optical information recording medium in a visible form, using a recording apparatus provided with a thermal head serving as recording means, and a ceramic heater serving as erasing means, with the amount of recording energy applied by the thermal head being adjusted in accordance with the changes in the recording temperature of the recording layer in the course of the above recording process.

Furthermore, the information stored in a recording layer of the CD-RW 3 was rewritten, using the above CD-RW drive, and in accordance with the rewriting of the information in the recording layer of the CD-RW 3, the previous information recorded in the reversible thermosensitive recording layer was erased by the ceramic heater serving as erasing means of the recoding apparatus, and a new information corresponding to the rewritten information stored in the recording layer of the CD-RW 3 was recorded in a visible form in the reversible thermosensitive recording layer.

The above rewriting process was repeated 100 times, and all the recording and erasing were satisfactorily carried out.

EXAMPLE 10

The reversible thermosensitive recording label 2 prepared in Example 9 was applied a MD (mini disk) cartridge 1 as illustrated in FIG. 4.

Part of information such as date and a title of music, stored in a MD, was recorded in the reversible thermosensitive recording layer in a visible form, using a recording apparatus provided with a thermal head serving as recording means, and a ceramic heater serving as erasing means, with the amount of recording energy applied by the thermal head being adjusted in accordance with the changes in the recording temperature of the reversible thermosensitive recording layer in the course of the above recording process.

Furthermore, the information stored in the MD was rewritten, and in accordance with the rewriting of the information in the MD, the previous information recorded in the reversible thermosensitive recording layer was erased by the ceramic heater serving as erasing means of the recoding apparatus, and a new information corresponding to the rewritten information stored in the MD was recorded in a visible form in the reversible thermosensitive recording layer.

The above rewriting process was repeated 100 times, and all the recording and erasing were satisfactorily carried out.

Comparative Example 6
[Preparation of Comparative Reversible Thermosensitive Recording Medium No. 6]

The procedure for preparation of the reversible thermosensitive recording material No. 2 in Example 2 was repeated except that the coating liquid for the formation of the thermosensitive recording layer used in Example 2 was replaced by a coating liquid with the following formulation, whereby a comparative reversible thermosensitive recording medium No. 6 was prepared:

|  | Parts by Weight |
| --- | --- |
| Behenyl behenate (Reagent, made by Sigma Chemical Co.) | 9.5 |
| Ethylenebis behenamide (Trademark: "Slipacks B", made by Nippon Kasei Chemical Co., Ltd.) | 0.5 |
| Vinyl chloride-vinyl acetate copolymer (Trademark: "VYHH", made by Union Carbide Japan K.K.) | 30 |
| Tetrahydrofuran | 160 |

The thermosensitive recording layer of the thus prepared comparative reversible thermosensitive recording medium No. 6 was not uniform with the conspicuous presence of white particles on the surface thereof.

Reversible thermosensitive recording media No. 1 to No. 8 of the present invention, which were respectively prepared in Examples 1 to 8, and comparative reversible thermosensitive recording media No. 1 to No. 6, which were respectively prepared in Comparative Examples 1 to 6, were subjected to an image formation evaluation, using a heat gradient tester "Type HG-100" (Trademark), made by Toyo Seiki Seisakusho, Ltd., under the conditions that each of the above recording media was heated to stepwise different temperatures with 5° C. temperature intervals for 1 second under application of a pressure of about 2.5 Kg/cm$^2$ thereto.

After each of the above recording media was heated in the above-mentioned manner, each recording medium was cooled to room temperature.

With respect to the reversible thermosensitive recording media No. 1, No. 3 to No. 6 of the present invention, and comparative reversible thermosensitive recording media No. 1 to No. 5, placing as a back sheet a commercially available film (Trademark: "# 50 Metalumy", made by Toyo Metallizing Co., Ltd., formed by vacuum-depositing aluminum with a thickness of about 400 Å on a transparent PET film) behind a heated portion of each of the recording media in the above-mentioned image formation process in such a manner that the aluminum-deposited side came into contact with the back side of each of each recording medium, while with respect to the reversible thermosensitive recording media No. 2, No. 5 to No. 8 of the present invention, and comparative reversible thermosensitive recording medium No. 6, without using such a back sheet, the optical densities of the heated portions at each of stepwise changed temperatures were measured, using Mcbeth densitometer RD-914. The results are shown in FIG. 13 to FIG. 18. From those results, the following characteristics were read or calculated, which are shown in TABLE 5 and TABLE 7:

Maximum reflection density (Dmax1),
First color average density (Dtav),
First color lower-limit density (Dtm),
Second color upper-limit density (Ds),
First color initiation density (Dta),
Second color assuming lower-limit temperature (Tsl), First color assuming initiation temperature (Tta)

First color assuming lower-limit temperature (Ttl),

First color assuming upper-limit temperature (Ttu),

Temperature difference (ΔTts) between second color assuming lower-limit temperature(Tsl) and first color assuming upper-limit temperature (Ttu), and First color variation temperature difference width (ΔTw)

Furthermore, the following characteristics were measured:

(1) Contrast=Dtav—Dmin1 (calculated from the respective values shown in TABLE 5 and TABLE 7)

(2) Heat Resistance:

Each reversible thermosensitive recording medium was made transparent in its entirety before the evaluation thereof, and was then partially made sufficiently milky white, using a heat gradient tester. Each of the samples was then placed in temperature-constant chambers of which temperatures were set at 75° C., 80° C., 85° C. and 90° C. for 1 hour, and the optical densities of milky white portions were measured, using Mcbeth densitometer RD-914.

(3) Optimum printing energy:

Each reversible thermosensitive recording medium was made transparent before the evaluation thereof, and was then heated, gradually increasing printing energy applied thereto, using a commercially available readerwriter (Trademark: "RC-30/M20", made by Oki Electric Industry Co., Ltd.), whereby an amount of printing energy necessary for making sufficiently milky white a portion of the recording medium to which the printing energy was applied was determined as the optimum printing energy.

(4) Repeated use durability No. 1:

A commercially available overprint varnish (Trademark: "New Daicure GP", made by Dainippon Ink & Chemicals, Incorporated.) was coated with a thickness of about 2 μm on a front surface of each reversible thermosensitive recording medium, using RI tester, and was then cured with the radiation with ultraviolet light, using a high-pressure mercury lamp.

Using a commercially available readerwriter (Trademark: "RC-30/M20", made by Oki Electric Industry Co., Ltd.), an image was printed on the above reversible thermosensitive recording medium with an optimum printing energy, and was then erased with an optimum erasing temperature. The above printing and erasing cycle was repeated 50 times, and the varnish applied surface of each reversible thermosensitive recording medium was visually inspected to see some scratches thereon. The evaluation was conducted with the following standards:

○: substantially no scratches

Δ: slight scratches

Δ–x: conspicuous scratches x: considerable scratches (5) Repeated use durability No. 2:

The same durability test as for the above-mentioned repeated use durability No. 1 was conducted except that the optimum printing energy for each recording medium was increased by 40%, and as in the test for the repeated use durability No. 1, the printing and erasing cycle was repeated 50 times. By increasing the optimum printing energy by 40%, this test constituted a 10-time forced test corresponding to a test for repeating the printing and erasing cycle in the test for the repeated use durability No. 1 was repeated 500 times.

The image density obtained at the $50^{th}$ cycle of the printing and erasing was measured by Mcbeth densitometer RD-914 for each reversible thermosensitive recording medium tested.

The results of the above-mentioned evaluation tests are shown in TABLE 6 and TABLE 8.

(6) Erasability:

Each reversible thermosensitive recording medium was made transparent in its entirety before the evaluation thereof, and was then partially made milky white, using a heat gradient tester, and the portion which was made milky white was then erased, using a readerwriter (Trademark: "R-3000", made by Kyushu Matsushita Electric Co., Ltd.), at an optimum erasing temperature, at an ambient temperature of 35° C. With respect to each recording medium, 50 samples were subjected to this erasing test to assess the erasability of each recording medium.

The erased state of the milky white portion was visually inspected and evaluated with the following standards:

○: complete erasing possible

○–Δ: slightly non-erased portions remain

When the evaluation was performed with respect to (3) Optimum printing energy, (4) Repeated use durability No. 1, (5) Repeated use durability No. 2, and (6) Erasability, a 125 μm thick PET film was applied to each of the recording media in Examples 1, 3 and 4 and Comparative Examples 1 to 5, using a duplex adhesive tape, before the evaluation, while with respect to the media in Examples 2, 5 to 8, and Comparative 6, such a duplex adhesive tape was not used.

TABLE 5

| | Dmax1 | 0.7 × Dmax1 | Dtav | Dmin1 | Dtm | Ds | Dta | Tsl (° C.) | Ttl (° C.) | ΔTw (° C.) | Ttu (° C.) | ΔTts (° C.) | Tta (° C.) |
|---|---|---|---|---|---|---|---|---|---|---|---|---|---|
| Ex. 1 | 1.10 | 0.77 | 1.05 | 0.13 | 0.87 | 0.22 | 0.36 | 150 | 99 | 44 | 143 | 7 | 97 |
| Ex. 2 | 1.30 | 0.91 | 1.19 | 0.29 | 1.01 | 0.38 | 0.52 | 152 | 99 | 43 | 142 | 10 | 97 |
| Ex. 3 | 1.05 | 0.74 | 0.98 | 0.26 | 0.84 | 0.33 | 0.44 | 145 | 114 | 21 | 135 | 10 | 110 |
| Ex. 4 | 1.31 | 0.92 | 1.23 | 0.30 | 1.04 | 0.39 | 0.53 | 135 | 108 | 22 | 130 | 5 | 100 |
| Comp. Ex. 1 | 1.01 | 0.71 | 0.92 | 0.13 | 0.76 | 0.21 | 0.33 | 133 | 98 | 25 | 123 | 9 | 92 |
| Comp. Ex. 2 | 1.01 | 0.71 | 0.96 | 0.11 | 0.79 | 0.20 | 0.32 | 122 | 83 | 29 | 112 | 10 | 78 |
| Comp. Ex. 3 | 0.81 | 0.57 | 0.73 | 0.10 | 0.60 | 0.16 | 0.26 | 157 | 83 | 52 | 135 | 22 | 81 |
| Comp. Ex. 4 | 0.88 | 0.62 | 0.77 | 0.09 | 0.63 | 0.16 | 0.26 | 155 | 68 | 64 | 132 | 23 | 67 |
| Comp. Ex. 5 | 0.64 | 0.45 | 0.53 | 0.12 | 0.45 | 0.16 | 0.22 | 174 | 77 | 55 | 132 | 42 | 71 |

TABLE 6

|  | Image Contrast | Heat Resistance 80° C. | 85° C. | 90° C. | 95° C. | Optimum Printing Energy (mJ/dot) | Repeated Use Durability No. 1 | Repeated Use Durability No. 2 | Erasability |
|---|---|---|---|---|---|---|---|---|---|
| Ex. 1 | 0.92 | 0.18 | 0.41 | 1.05 | 1.07 | 0.30 | ○ | 1.01 | ○ |
| Ex. 2 | 0.90 | 0.32 | 0.49 | 1.18 | 1.22 | 0.30 | ○ | 1.10 | ○ |
| Ex. 3 | 0.72 | 0.27 | 0.29 | 0.30 | 0.45 | 0.28 | ○ | 0.83 | ○ – Δ |
| Ex. 4 | 0.93 | 0.33 | 0.35 | 0.50 | 1.21 | 0.26 | ○ | 0.81 | ○ – Δ |
| Comp. Ex. 1 | 0.79 | 0.80 | 0.89 | 0.91 | 0.94 | 0.26 | ○ | 0.92 | ○ – Δ |
| Comp. Ex. 2 | 0.85 | 0.92 | 0.95 | 0.94 | 0.95 | 0.24 | ○ | 0.81 | ○ |
| Comp. Ex. 3 | 0.63 | 0.75 | 0.77 | 0.78 | 0.75 | 0.35 | Δ – x | 0.80 | ○ |
| Comp. Ex. 4 | 0.68 | 0.77 | 0.80 | 0.79 | 0.81 | 0.35 | Δ – x | 0.87 | ○ |
| Comp. Ex. 5 | 0.41 | 0.55 | 0.60 | 0.59 | 0.61 | 0.40 | x | 0.65 | ○ |

TABLE 7

|  | Dmax1 | 0.7 × Dmax1 | Dtav | Dmin1 | Dtm | Ds | Dta | Tsl (° C.) | Ttl (° C.) | ΔTw (° C.) | Ttu (° C.) | ΔTts (° C.) | Tta (° C.) |
|---|---|---|---|---|---|---|---|---|---|---|---|---|---|
| Ex. 5 | 1.42 | 0.99 | 1.40 | 0.20 | 1.16 | 0.32 | 0.50 | 142 | 103 | 36 | 139 | 3 | 98 |
| Ex. 6 | 1.40 | 0.98 | 1.36 | 0.22 | 1.13 | 0.33 | 0.51 | 140 | 111 | 26 | 137 | 3 | 106 |
| Ex. 7 | 1.35 | 0.95 | 1.36 | 0.22 | 1.13 | 0.33 | 0.51 | 152 | 98 | 38 | 146 | 6 | 95 |
| Ex. 8 | 1.36 | 0.95 | 1.31 | 0.23 | 1.09 | 0.34 | 0.50 | 167 | 116 | 45 | 161 | 6 | 110 |
| Comp. Ex. 6 | 0.81 | 0.57 | 0.79 | 0.46 | 0.72 | 0.49 | 0.54 | 125 | 81 | 23 | 104 | 21 | 75 |

TABLE 8

|  | Image Contrast | Heat Resistance 80° C. | 85° C. | 90° C. | 95° C. | Optimum Printing Energy (mJ/dot) | Repeated Use Durability No. 1 | Repeated Use Durability No. 2 | Erasability |
|---|---|---|---|---|---|---|---|---|---|
| Ex. 5 | 1.20 | 0.32 | 0.44 | 1.30 | 1.34 | 0.27 | ○ | 0.31 | ○ |
| Ex. 6 | 1.14 | 0.33 | 0.35 | 0.45 | 1.28 | 0.28 | ○ | 0.32 | ○ – Δ |
| Ex. 7 | 1.14 | 0.33 | 0.50 | 1.28 | 1.30 | 0.29 | ○ | 0.35 | ○ |
| Ex. 8 | 1.08 | 0.28 | 0.32 | 0.35 | 0.45 | 0.38 | ○ | 0.40 | ○ |
| Comp. Ex. 6 | 0.33 | 0.78 | 0.80 | 0.79 | 0.78 | 0.26 | ○ | 0.75 | ○ – Δ |

Japanese Patent Application No. 9-254132 filed Sep. 4, 1997 is hereby incorporated by reference.

What is claimed is:

1. A reversible thermosensitive recording medium, comprising a substrate and a recording layer formed thereon capable of assuming a first color in a first temperature range which is above room temperature, having a first color assuming initiation temperature and a first color assuming upper-limit temperature, and assuming a second color when heated to a second temperature range which is above said first temperature range and then cooled, having a second color assuming lower-limit temperature, (a) said first color assuming upper-limit temperature being 125° C. or more,
(b) the difference between said first color assuming upper-limit temperature and said second color assuming lower-limit temperature being 20° C. or less,
(c) said first color assuming initiation temperature being 95° C. or more, and
(d) said recording layer comprising (i) a matrix resin and an organic low-molecular-weight material which comprises a mixture of at least one straight chain compound (A) comprising at least one bond selected from the group consisting of amide bond, urea bond and sulfonyl bond, and at least one carboxyl group, and having a melting point of 130° C. or more, and at least one straight chain compound (B) having a melting point which is lower by at least 20° C. than the melting point of said straight chain compound (A) or (ii) a matrix resin and an organic low-molecular weight compound having a melting point of 130° C. or more which has been dispersed in the form of a solid in said matrix resin.

2. The reversible thermosensitive recording medium as claimed in claim 1, wherein said reversible thermosensitive recording medium further has a first color assuming lower-limit temperature, and the difference between said first color assuming upper-limit temperature and said first color assuming lower-limit temperature is 20° C. or more.

3. The reversible thermosensitive recording medium as claimed in claim 2, wherein said first color assuming upper-limit temperature is 130° C. or more.

4. The reversible thermosensitive recording medium as claimed in claim 2, wherein said difference between said first color assuming upper-limit temperature and said second color assuming lower-limit temperature is 15° C. or less.

5. The reversible thermosensitive recording medium as claimed in claim 1, wherein said first color assuming upper-limit temperature is 130° C. or more.

6. The reversible thermosensitive recording medium as claimed in claim 5, wherein said difference between said first color assuming upper-limit temperature and said second color assuming lower-limit temperature is 15° C. or less.

7. The reversible thermosensitive recording medium as claimed in claim 1, wherein said difference between said first color assuming upper-limit temperature and said second color assuming lower-limit temperature is 15° C. or less.

8. A card comprising:
   a reversible thermosensitive recording portion which comprises said reversible thermosensitive recording medium as claimed in claim 1, and
   an information memory portion.

9. The card as claimed in claim 8, wherein said information memory portion comprises at least one element selected from the group consisting of a magnetic recording layer, IC and an optical memory.

10. The card as claimed in claim 9, further comprising a support on one side of which said reversible thermosensitive recording portion is provided, wherein said information memory portion comprises said magnetic recording layer and is provided on a back side of said support opposite to said reversible thermosensitive recording portion with respect to said support.

11. The card as claimed in claim 8, further comprising a portion in which an image can be irreversibly printed, or which includes such irreversibly printed image.

12. A reversible thermosensitive recording label comprising:
   a support,
   a reversible thermosensitive recording portion which comprises said reversible thermosensitive recording medium as claimed in claim 1, which is provided on one side of said support, and
   an adhesive or tacky layer on a back side of said support opposite to said reversible thermosensitive recording portion.

13. The reversible thermosensitive recording label as claimed in claim 12, further comprising a portion in which an image can be irreversibly printed, or which includes such irreversibly printed image.

14. A disk cartridge comprising:
   a cartridge,
   a rewritable disk in which information to be recorded therein is rewritable, which rewritable disk is built in said cartridge, and
   a reversible thermosensitive display portion which comprises said reversible thermosensitive recording medium as claimed in claim 1, which reversible thermosensitive recording display is provided on the surface of said cartridge.

15. The disk cartridge as claimed in claim 14, further comprising a portion in which an image can be irreversibly printed, or which includes such irreversibly printed image.

16. A disk comprising:
   a rewritable or write-once disk in which information to be recorded therein is rewritable or writable, and
   a reversible thermosensitive display portion which comprises said reversible thermosensitive recording medium as claimed in claim 1, which reversible thermosensitive display portion is provided on the surface of said rewritable or write-once disk.

17. The disk as claimed in claim 16, further comprising a portion in which an image can be irreversibly printed, or which includes such irreversibly printed image.

18. A tape cassette comprising:
   a cassette member,
   a rewritable tape member in which information to be recorded therein is rewritable, disposed in said cassette member, and
   a reversible thermosensitive display portion which comprises said reversible thermosensitive recording medium as claimed in claim 1, which reversible thermosensitive display portion is provided on the surface of said cassette member.

19. The tape cassette as claimed in claim 18, further comprising a portion in which an image can be irreversibly printed, or which includes such irreversibly printed image.

20. A reversible thermosensitive recording medium comprising a substrate and a reversible thermosensitive recording layer which comprises a matrix resin and an organic low-molecular-weight material dispersed in said matrix resin, of which transparency is reversibly changeable depending upon the temperature thereof, said organic low-molecular-weight material comprising a mixture of at least one straight chain compound (A) comprising at least one bond selected from the group consisting of amide bond, urea bond and sulfonyl bond, and at least one carboxyl group, and having a melting point of 130° C. or more, and at least one straight chain compound (B) having a melting point which is lower by at least 20° C. than the melting point of said straight chain compound (A), said reversible thermosensitive recording medium capable of assuming a first color in a first temperature range which is above room temperature, having a first color assuming initiation temperature and a first color assuming upper-limit temperature, and assuming a second color when heated to a second temperature range which is above said first temperature range and then cooled, having a second color assuming lower-limit temperature,
   (a) said first color assuming upper-limit temperature being 125° C. or more,
   (b) the difference between said first color assuming upper-limit temperature and said second color assuming lower-limit temperature being 20° C. or less, and
   (c) said first color assuming initiation temperature being 95° C. or more.

21. The reversible thermosensitive recording medium as claimed in claim 20, wherein said reversible thermosensitive recording medium further has a first color assuming lower-limit temperature, and the difference between said first color assuming upper-limit temperature and said first color assuming lower-limit temperature is 20° C. or more.

22. The reversible thermosensitive recording medium as claimed in claim 21, wherein said first color assuming upper-limit temperature is 130° C. or more.

23. The reversible thermosensitive recording medium as claimed in claim 21, wherein said difference between said first color assuming upper-limit temperature and said second color assuming lower-limit temperature is 15° C. or less.

24. The reversible thermosensitive recording medium as claimed in claim 20, wherein said first color assuming upper-limit temperature is 130° C. or more.

25. The reversible thermosensitive recording medium as claimed in claim 24, wherein said difference between said first color assuming upper-limit temperature and said second color assuming lower-limit temperature is 15° C. or less.

26. The reversible thermosensitive recording medium as claimed in claim 20, wherein said difference between said first color assuming upper-limit temperature and said second color assuming lower-limit temperature is 15° C. or less.

27. The reversible thermosensitive recording medium as claimed in claim 20, wherein said straight chain compound (B) has a melting point of 85° C. or more.

28. The reversible thermosensitive recording medium as claimed in claim 27, wherein said straight chain compound (B) has a melting point in a range of 85° C. to 120° C.

29. The reversible thermosensitive recording medium as claimed in claim 28, wherein said straight chain compound (B) and said straight chain compound (A) are mixed in a mixing ratio by parts by weight of 98:2 to 10:90.

30. The reversible thermosensitive recording medium as claimed in claim 27, wherein said straight chain compound (B) and said straight chain compound (A) are mixed in a mixing ratio by parts by weight of 98:2 to 10:90.

31. The reversible thermosensitive recording medium as claimed in claim 20, wherein said straight chain compound (B) has a melting point of 120° C. or less.

32. The reversible thermosensitive recording medium as claimed in claim 31, wherein said straight chain compound (B) and said straight chain compound (A) are mixed in a mixing ratio by parts by weight of 98:2 to 10:90.

33. The reversible thermosensitive recording medium as claimed in claim 20, wherein said straight chain compound (B) and said straight chain compound (A) are mixed in a mixing ratio by parts by weight of 98:2 to 10:90.

34. The reversible thermosensitive recording medium as claimed in claim 20, wherein as said straight chain compound (A) is used a straight chain compound comprising an amide bond and a carboxyl group.

35. The reversible thermosensitive recording medium as claimed in claim 34, wherein as said straight chain compound (A) is used a straight chain compound of general formula (1):

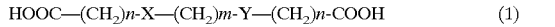
$$HOOC-(CH_2)n-X-(CH_2)m-Y-(CH_2)n-COOH \quad (1)$$

wherein $1 \leq n \leq 26$, $1 \leq m \leq 26$, and X and Y each independently represent CONH or NHCO, but do not have an identical structure at the same time.

36. The reversible thermosensitive recording medium as claimed in claim 20, wherein as said straight chain compound (A) is used a straight chain compound comprising a urea bond and a carboxyl group.

37. The reversible thermosensitive recording medium as claimed in claim 36, wherein as said straight chain compound (A) is used a straight chain compound of general formula (2):

$$CH_3-(CH_2)n-Z-(CH_2)m-COOH \quad (2)$$

wherein $0 \leq n \leq 25$, $1 \leq m \leq 26$, and Z represents NHCONH.

38. The reversible thermosensitive recording medium as claimed in claim 20, wherein as said straight chain compound (A) is used a straight chain compound comprising a sulfonyl bond and a carboxyl group.

39. The reversible thermosensitive recording medium as claimed in claim 38, wherein as said straight chain compound (A) is used a straight chain compound of general formula (3):

$$CH_3-(CH_2)n-Z-(CH_2)m-COOH \quad (3)$$

wherein $0 \leq n \leq 25$, $1 \leq m \leq 26$, and Z represents $SO_2$.

40. The reversible thermosensitive recording medium as claimed in claim 20, wherein said organic low-molecular-weight material further comprises at least one straight chain compound (C) in said mixture, having a melting point which is higher by at least 10° C. than that of said straight chain compound (B) and is lower by at least 10° C. than that of said straight chain compound (A).

41. A card comprising:
a reversible thermosensitive recording portion which comprises said reversible thermosensitive recording medium as claimed in claim 20, and
an information memory portion.

42. The card as claimed in claim 41, wherein said information memory portion comprises at least one element selected from the group consisting of a magnetic recording layer, IC and an optical memory.

43. The card as claimed in claim 42, further comprising a support on one side of which said reversible thermosensitive recording portion is provided, wherein said information memory portion comprises said magnetic recording layer and is provided on a back side of said support opposite to said reversible thermosensitive recording portion with respect to said support.

44. The card as claimed in claim 41, further comprising a portion in which an image can be irreversibly printed, or which includes such irreversibly printed image.

45. A reversible thermosensitive recording label comprising:
a support,
a reversible thermosensitive recording portion which comprises said reversible thermosensitive recording medium as claimed in claim 20, which is provided on one side of said support, and
an adhesive or tacky layer on a back side of said support opposite to said reversible thermosensitive recording portion.

46. A disk cartridge comprising:
a cartridge,
a rewritable disk in which information to be recorded therein is rewritable, which rewritable disk is built in said cartridge, and
a reversible thermosensitive recording label as claimed in claim 45, which reversible thermosensitive recording label is provided on the surface of said cartridge.

47. The disk cartridge as claimed in claim 46, further comprising a portion in which an image can be irreversibly printed, or which includes such irreversibly printed image.

48. A disk comprising:
a rewritable or write-once disk in which information to be recorded therein is rewritable or writable, and
a reversible thermosensitive recording label as claimed in claim 45, which reversible thermosensitive recording label is provided on the surface of said rewritable or write-once disk.

49. The disk as claimed in claim 48, further comprising a portion in which an image can be irreversibly printed, or which includes such irreversibly printed image.

50. A tape cassette comprising:
a cassette member,
a rewritable tape member in which information to be recorded therein is rewritable, disposed in said cassette member, and
a reversible thermosensitive recording label as claimed in claim 45, which reversible thermosensitive recording label is provided on the surface of said cassette member.

51. The reversible thermosensitive recording label as claimed in claim 45, further comprising a portion in which an image can be irreversibly printed, or which includes such irreversibly printed image.

52. A disk cartridge comprising:

a cartridge, a rewritable disk in which information to be recorded therein is rewritable, which rewritable disk is built in said cartridge, and a reversible thermosensitive display portion which comprises said reversible thermosensitive recording medium as claimed in claim 20, which reversible thermosensitive recording display is provided on the surface of said cartridge.

53. The disk cartridge as claimed in claim 52, further comprising a portion in which an image can be irreversibly printed, or which includes such irreversibly printed image.

54. A disk comprising:

a rewritable or write-once disk in which information to be recorded therein is rewritable or writable, and a reversible thermosensitive display portion which comprises said reversible thermosensitive recording medium as claimed in claim 20, which reversible thermosensitive display portion is provided on the surface of said rewritable or write-once disk.

55. The disk as claimed in claim 54, further comprising a portion in which an image can be irreversibly printed, or which includes such irreversibly printed image.

56. A tape cassette comprising:

a cassette member, a rewritable tape member in which information to be recorded therein is rewritable, disposed in said cassette member, and a reversible thermosensitive display portion which comprises said reversible thermosensitive recording medium as claimed in claim 20, which reversible thermosensitive display portion is provided on the surface of said cassette member.

57. The tape cassette as claimed in claim 56, further comprising a portion in which an image can be irreversibly printed, or which includes such irreversibly printed image.

58. The reversible thermosensitive recording medium as claimed in claim 20, further comprising a portion in which an image can be irreversibly printed, or which includes such irreversibly printed image.

59. A method of recording images or erasing recorded images comprising applying heat for recording or erasing images to one of recording media selected from the group consisting of:

a reversible thermosensitive recording medium as claimed in claim 20, a card comprising a reversible thermosensitive recording portion which comprises said reversible thermosensitive recording medium, and an information memory portion, a reversible thermosensitive recording label comprising a support, a reversible thermosensitive recording portion which comprises said reversible thermosensitive recording medium, which is provided on one side of said support, and an adhesive or tacky layer on a back side of said support opposite to said reversible thermosensitive recording portion, a disk cartridge comprising a cartridge, a rewritable disk in which information to be recorded therein is rewritable, which rewritable disk is built in said cartridge, and a reversible thermosensitive display portion which comprises said reversible thermosensitive recording medium or said label, provided on the surface of said cartridge, a disk comprising a rewritable or write-once disk in which information to be recorded therein is rewritable or writable, and a reversible thermosensitive display portion which comprises said reversible thermosensitive recording medium or said label, provided on the surface of said rewritable or write-once disk, and a tape cassette comprising a cassette member, a rewritable tape member in which information to be recorded therein is rewritable, disposed in said cassette member, and a reversible thermosensitive display portion which comprises said reversible thermosensitive recording medium or said label, provided on the surface of said cassette member.

60. The method as claimed in claim 59, wherein the application of heat for recording images is carried out, using a thermal head.

61. The method as claimed in claim 59, wherein the application of heat for erasing recorded images is carried out, using a thermal head.

62. The method as claimed in claim 59, wherein the application of heat for recording images and for erasing recorded images is carried out, using a thermal head.

63. The method as claimed in claim 59, wherein the erasing of recorded images is carried out by overwriting, with the application of heat thereto, and then images are recorded, using a thermal head.

64. The method as claimed in claim 67, wherein the application of heat for erasing recorded images is carried out, using a ceramic heater.

65. The method as claimed in claim 64, wherein said ceramic heater is set at a temperature of 110° C. or more for the application of heat for erasing recorded images.

66. A method of producing a reversible thermosensitive recording medium comprising a support, and a reversible thermosensitive recording layer formed thereon comprising a matrix resin and an organic low-molecular-weight material dispersed in said matrix resin, of which transparency is reversibly changeable depending upon the temperature thereof, capable of assuming a first color in a first temperature range which is above room temperature, having a first color assuming initiation temperature and a first color assuming upper-limit temperature, and assuming a second color when heated to a second temperature range which is above said first temperature range and then cooled, having a second color assuming lower-limit temperature, (a) said first color assuming upper-limit temperature being 125° C. or more, (b) the difference between said first color assuming upper-limit temperature and said second color assuming lower-limit temperature being 20° C. or less, and (c) said first color assuming initiation temperature being 95° C. or more, comprising the steps of:

coating on said support a dispersion comprising a solvent, said matrix resin and said organic low-molecular-weight material comprising an organic low-molecular-weight compound having a melting point of 130° C. or more, which organic low-molecular-weight material is dispersed in the form of a solid in said matrix resin, and drying said dispersion with application of heat thereto so as to dissolve said organic low-molecular-weight weight material in said solvent when heat is applied thereto, thereby forming said reversible thermosensitive recording layer on said support.

67. The method as claimed in claim 66, wherein said organic low-molecular-weight material dispersed in said dispersion has a solubility of 0.5% or more in said solvent at a temperature at which said dispersion coated on said support is dried with application of heat thereto.

68. The method as claimed in claim 66, wherein said organic low-molecular-weight material dispersed in said dispersion has a solubility of less than 0.5% in said solvent at room temperature.

69. A method of producing a reversible thermosensitive recording medium comprising a support, and a reversible thermosensitive recording layer formed thereon comprising a matrix resin and an organic low-molecular-weight material dispersed in said matrix resin, of which transparency is reversibly changeable depending upon the temperature thereof, capable of assuming a first color in a first temperature range which is above room temperature, having a first color assuming initiation temperature and a first color assuming upper-limit temperature, and assuming a second color when heated to a second temperature range which is above said first temperature range and then cooled, having a second color assuming lower-limit temperature, (a) said first color assuming upper-limit temperature being 125° C. or more,
(b) the difference between said first color assuming upper-limit temperature and said second color assuming lower-limit temperature being 20° C. or less, and
(c) said first color assuming initiation temperature being 95° C. or more, comprising the steps of:
  coating on said support a dispersion comprising a solvent, said matrix resin and said organic low-molecular-weight material comprising (a) at least one organic low-molecular-weight compound and (b) an organic low-molecular-weight compound having a melting point of 130° C. or more, which organic low-molecular-weight material is dispersed in the form of a solid in said matrix resin, and
  drying said dispersion with application of heat thereto at a temperature which is lower than the highest melting point of the melting points of said organic low-molecular-weight compounds, and then at a temperature which is not lower than the highest melting point of the melting points of said organic low-molecular-weight compounds, thereby forming said reversible thermosensitive recording layer on said support.

* * * * *